(12) United States Patent
Tourapis et al.

(10) Patent No.: US 10,812,801 B2
(45) Date of Patent: Oct. 20, 2020

(54) ADAPTIVE TRANSFER FUNCTION FOR VIDEO ENCODING AND DECODING

(71) Applicant: Apple Inc., Cupertino, CA (US)

(72) Inventors: Alexandros Tourapis, Sunnyvale, CA (US); David Singer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 14/631,410

(22) Filed: Feb. 25, 2015

(65) Prior Publication Data

US 2015/0245050 A1    Aug. 27, 2015

Related U.S. Application Data

(60) Provisional application No. 61/944,484, filed on Feb. 25, 2014, provisional application No. 61/946,638, (Continued)

(51) Int. Cl.
*H04N 19/52*    (2014.01)
*H04N 19/182*   (2014.01)
(Continued)

(52) U.S. Cl.
CPC ........... *H04N 19/14* (2014.11); *G06F 3/1454* (2013.01); *G06T 5/009* (2013.01); *G09G 3/2007* (2013.01);
(Continued)

(58) Field of Classification Search
None
See application file for complete search history.

(56) References Cited

U.S. PATENT DOCUMENTS 5,042,077 A * 8/1991 Burke ................. G01R 33/54
                                              382/128
5,357,278 A * 10/1994 Herz ..................... H03M 7/50
                                              375/240.01
(Continued)

FOREIGN PATENT DOCUMENTS

CN    101119497     2/2008
CN    101800040     8/2010
(Continued)

OTHER PUBLICATIONS

International Search Report and Written Opinion from PCT/US2015/017536, dated Jul. 28, 2015, Apple Inc., pp. 1-18.
(Continued)

*Primary Examiner* — Mohammad J Rahman
(74) *Attorney, Agent, or Firm* — Fish & Richardson P.C.

(57) ABSTRACT

A video encoding and decoding system that implements an adaptive transfer function method internally within the codec for signal representation. A focus dynamic range representing an effective dynamic range of the human visual system may be dynamically determined for each scene, sequence, frame, or region of input video. The video data may be cropped and quantized into the bit depth of the codec according to a transfer function for encoding within the codec. The transfer function may be the same as the transfer function of the input video data or may be a transfer function internal to the codec. The encoded video data may be decoded and expanded into the dynamic range of display(s). The adaptive transfer function method enables the codec to use fewer bits for the internal representation of the signal while still representing the entire dynamic range of the signal in output.

19 Claims, 14 Drawing Sheets

Related U.S. Application Data filed on Feb. 28, 2014, provisional application No. 61/946,633, filed on Feb. 28, 2014.

(51) Int. Cl.

| | |
|---|---|
| *H04N 19/14* | (2014.01) |
| *H04N 19/176* | (2014.01) |
| *G06F 3/14* | (2006.01) |
| *G09G 5/02* | (2006.01) |
| *G09G 5/10* | (2006.01) |
| *H04N 1/64* | (2006.01) |
| *H04N 5/20* | (2006.01) |
| *H04N 5/235* | (2006.01) |
| *H04N 19/172* | (2014.01) |
| *H04N 19/102* | (2014.01) |
| *H04N 19/137* | (2014.01) |
| *H04N 19/177* | (2014.01) |
| *H04N 19/124* | (2014.01) |
| *H04N 19/154* | (2014.01) |
| *H04N 19/17* | (2014.01) |
| *H04N 19/98* | (2014.01) |
| *H04N 21/422* | (2011.01) |
| *H04N 21/431* | (2011.01) |
| *G06T 5/00* | (2006.01) |
| *G09G 3/20* | (2006.01) |
| *G09G 5/00* | (2006.01) |
| *H04N 1/60* | (2006.01) |
| *H04N 5/50* | (2006.01) |
| *H04N 9/64* | (2006.01) |
| *H04N 9/67* | (2006.01) |
| *H04N 19/136* | (2014.01) |
| *H04N 19/184* | (2014.01) |
| *H04N 19/186* | (2014.01) |
| *H04N 19/169* | (2014.01) |
| *H04N 19/44* | (2014.01) |
| *H04N 19/30* | (2014.01) |
| *H04N 19/33* | (2014.01) |
| *H04N 19/86* | (2014.01) |
| *H04N 19/463* | (2014.01) |
| *H04N 21/4223* | (2011.01) |
| *H04N 21/44* | (2011.01) |
| *H04N 21/4402* | (2011.01) |
| *H04N 21/442* | (2011.01) |
| *H04N 21/485* | (2011.01) |

(52) U.S. Cl.
CPC .............. *G09G 5/005* (2013.01); *G09G 5/02* (2013.01); *G09G 5/10* (2013.01); *H04N 1/6066* (2013.01); *H04N 1/64* (2013.01); *H04N 5/20* (2013.01); *H04N 5/2355* (2013.01); *H04N 5/505* (2013.01); *H04N 9/641* (2013.01); *H04N 9/67* (2013.01); *H04N 19/102* (2014.11); *H04N 19/124* (2014.11); *H04N 19/136* (2014.11); *H04N 19/137* (2014.11); *H04N 19/154* (2014.11); *H04N 19/17* (2014.11); *H04N 19/172* (2014.11); *H04N 19/176* (2014.11); *H04N 19/177* (2014.11); *H04N 19/182* (2014.11); *H04N 19/184* (2014.11); *H04N 19/186* (2014.11); *H04N 19/188* (2014.11); *H04N 19/30* (2014.11); *H04N 19/33* (2014.11); *H04N 19/44* (2014.11); *H04N 19/52* (2014.11); *H04N 19/98* (2014.11); *H04N 21/42202* (2013.01); *H04N 21/4318* (2013.01); *G06T 2207/20208* (2013.01); *G09G 2320/0261* (2013.01); *G09G 2320/0271* (2013.01); *G09G 2320/062* (2013.01); *G09G 2320/066* (2013.01); *G09G 2320/0613* (2013.01); *G09G 2320/0626* (2013.01); *G09G 2320/0666* (2013.01); *G09G 2320/0673* (2013.01); *G09G 2320/0686* (2013.01); *G09G 2320/0693* (2013.01); *G09G 2320/08* (2013.01); *G09G 2320/103* (2013.01); *G09G 2340/02* (2013.01); *G09G 2360/144* (2013.01); *G09G 2370/042* (2013.01); *H04N 19/463* (2014.11); *H04N 19/86* (2014.11); *H04N 21/4223* (2013.01); *H04N 21/4402* (2013.01); *H04N 21/44008* (2013.01); *H04N 21/44218* (2013.01); *H04N 21/4854* (2013.01)

(56) References Cited

U.S. PATENT DOCUMENTS

| | | | | |
|---|---|---|---|---|
| 5,815,206 | A * | 9/1998 | Malladi | H04B 1/665 |
| | | | | 375/240.01 |
| 6,118,820 | A * | 9/2000 | Reitmeier | H04N 19/103 |
| | | | | 348/421.1 |
| 6,141,047 | A * | 10/2000 | Kawai | H04N 5/202 |
| | | | | 348/224.1 |
| 6,396,508 | B1 | 5/2002 | Noecker | |
| 6,560,285 | B1 * | 5/2003 | Reitmeier | H04N 21/23614 |
| | | | | 375/240.16 |
| 6,762,741 | B2 | 7/2004 | Weindorf | |
| 6,829,301 | B1 * | 12/2004 | Tinker | H04N 19/63 |
| | | | | 375/240.12 |
| 7,508,981 | B2 | 3/2009 | Park | |
| 7,593,024 | B2 | 9/2009 | Andrews et al. | |
| 7,730,043 | B1 * | 6/2010 | Bourdev | G06T 11/60 |
| | | | | 707/695 |
| 8,014,445 | B2 | 9/2011 | Segall et al. | |
| 8,212,764 | B2 | 7/2012 | Song et al. | |
| 8,248,486 | B1 | 8/2012 | Ward et al. | |
| 8,483,479 | B2 | 7/2013 | Kunkel et al. | |
| 8,625,844 | B2 | 1/2014 | Chen | |
| 8,773,543 | B2 * | 7/2014 | Alakarhu | H04N 5/23241 |
| | | | | 348/14.01 |
| 8,866,975 | B1 | 10/2014 | Chen et al. | |
| 8,888,592 | B1 | 11/2014 | Pereira et al. | |
| 8,897,378 | B2 | 11/2014 | Dougherty, III et al. | |
| 9,066,070 | B2 * | 6/2015 | Su | H04N 19/136 |
| 9,076,224 | B1 | 7/2015 | Shah et al. | |
| 9,258,641 | B2 * | 2/2016 | Tuttle | H04R 3/00 |
| 9,338,389 | B2 * | 5/2016 | Messmer | H04N 5/20 |
| 9,384,535 | B2 * | 7/2016 | Tan | G06T 5/008 |
| 9,451,274 | B2 | 9/2016 | Mertens | |
| 9,552,652 | B2 | 1/2017 | Thoma et al. | |
| 9,973,723 | B2 * | 5/2018 | Guo | H04N 5/46 |
| 10,200,687 | B2 * | 2/2019 | Guo | H04N 19/117 |
| 10,212,429 | B2 | 2/2019 | Guo et al. | |
| 10,212,456 | B2 * | 2/2019 | Guo | H04N 19/86 |
| 10,264,266 | B2 | 4/2019 | Pan | |
| 10,271,054 | B2 | 4/2019 | Greenebaum et al. | |
| 2002/0146178 | A1 | 10/2002 | Bolle et al. | |
| 2002/0164048 | A1 * | 11/2002 | Bruckstein | G06T 1/005 |
| | | | | 382/100 |
| 2002/0196470 | A1 | 12/2002 | Kawamoto et al. | |
| 2003/0086595 | A1 * | 5/2003 | Hu | G06T 9/00 |
| | | | | 382/128 |
| 2003/0103670 | A1 * | 6/2003 | Schoelkopf | G06T 11/001 |
| | | | | 382/162 |
| 2003/0202589 | A1 * | 10/2003 | Reitmeier | H04N 21/23614 |
| | | | | 375/240.12 |
| 2003/0228117 | A1 * | 12/2003 | Truitt | A61B 3/14 |
| | | | | 385/122 |
| 2004/0165253 | A1 * | 8/2004 | Cathey, Jr. | G02B 27/0025 |
| | | | | 359/322 |
| 2004/0213478 | A1 * | 10/2004 | Chesnokov | G06T 5/009 |
| | | | | 382/260 |
| 2005/0117799 | A1 * | 6/2005 | Fuh | G06T 5/009 |
| | | | | 382/169 |

(56) References Cited

U.S. PATENT DOCUMENTS

| | | |
|---|---|---|
| 2005/0219252 A1 | 10/2005 | Buxton et al. |
| 2006/0257050 A1* | 11/2006 | Obrador ............... G06T 7/0002 382/286 |
| 2007/0104378 A1 | 5/2007 | Aguera |
| 2007/0223813 A1* | 9/2007 | Segall ................. H04N 1/6027 382/166 |
| 2007/0256339 A1 | 11/2007 | Fryer et al. |
| 2008/0137990 A1 | 6/2008 | Ward |
| 2008/0291287 A1* | 11/2008 | Dvir ..................... H04N 1/4072 348/222.1 |
| 2008/0316372 A1 | 12/2008 | Xu et al. |
| 2009/0027558 A1* | 1/2009 | Mantiuk ............... H04N 1/6027 348/673 |
| 2009/0067506 A1* | 3/2009 | Doser ................... H04N 19/176 375/240.18 |
| 2009/0079753 A1 | 3/2009 | Alessi et al. |
| 2009/0219387 A1* | 9/2009 | Marman .......... G08B 13/19652 348/143 |
| 2009/0244386 A1* | 10/2009 | Norgaard ............... G06T 5/009 348/672 |
| 2010/0157078 A1 | 6/2010 | Atanassov et al. |
| 2010/0172411 A1 | 7/2010 | Efremov et al. |
| 2011/0012937 A1 | 1/2011 | Onishi et al. |
| 2011/0194618 A1 | 8/2011 | Gish et al. |
| 2011/0234612 A1 | 9/2011 | Wei et al. |
| 2011/0235720 A1* | 9/2011 | Banterle ................ G06T 5/009 375/240.25 |
| 2011/0243473 A1 | 10/2011 | Chen et al. |
| 2011/0260958 A1 | 10/2011 | Shabel et al. |
| 2011/0292992 A1 | 12/2011 | Sirivara |
| 2011/0316973 A1* | 12/2011 | Miller .................... G09G 3/003 348/43 |
| 2012/0007965 A1 | 1/2012 | Mihara et al. |
| 2012/0047542 A1 | 2/2012 | Lewis et al. |
| 2012/0051635 A1* | 3/2012 | Kunkel .................. G06T 5/009 382/165 |
| 2012/0081279 A1 | 4/2012 | Greenebaum |
| 2012/0105681 A1* | 5/2012 | Morales .................. G06T 5/50 348/239 |
| 2012/0206470 A1* | 8/2012 | Frank .................. H04N 1/4078 345/581 |
| 2012/0314944 A1 | 12/2012 | Ninan et al. |
| 2012/0321273 A1 | 12/2012 | Messmer |
| 2013/0003086 A1 | 1/2013 | Mebane et al. |
| 2013/0044122 A1 | 2/2013 | Ho et al. |
| 2013/0076763 A1 | 3/2013 | Messmer |
| 2013/0076974 A1 | 3/2013 | Atkins |
| 2013/0148029 A1* | 6/2013 | Gish ........................ G09G 5/02 348/708 |
| 2013/0177240 A1* | 7/2013 | Thoma ................. H04N 19/647 19/647 |
| 2013/0223531 A1* | 8/2013 | Garbas ................. H04N 19/136 375/240.14 |
| 2013/0265232 A1 | 10/2013 | Yun et al. |
| 2013/0271779 A1 | 10/2013 | Suzuki |
| 2013/0308027 A1 | 11/2013 | Jenkin |
| 2013/0321671 A1 | 12/2013 | Cote et al. |
| 2013/0328842 A1 | 12/2013 | Barnhoefer et al. |
| 2014/0022460 A1* | 1/2014 | Li ........................... G06T 5/009 348/708 |
| 2014/0024453 A1 | 1/2014 | Eberwein et al. |
| 2014/0044372 A1* | 2/2014 | Mertens ................. H04N 19/46 382/248 |
| 2014/0050271 A1* | 2/2014 | Su ....................... H04N 19/136 375/240.26 |
| 2014/0079113 A1* | 3/2014 | Newton ................. G09G 5/006 375/240.01 |
| 2014/0092012 A1 | 4/2014 | Seshadrinathan et al. |
| 2014/0092108 A1 | 4/2014 | Moon et al. |
| 2014/0198137 A1 | 7/2014 | Feng et al. |
| 2014/0212062 A1* | 7/2014 | Finlayson .............. G06T 5/003 382/263 |
| 2014/0229875 A1 | 8/2014 | Li et al. |
| 2014/0241418 A1 | 8/2014 | Garbas et al. |
| 2014/0247870 A1* | 9/2014 | Mertens ................. H04N 19/46 375/240.08 |
| 2014/0254928 A1* | 9/2014 | Tsai ....................... G06T 5/008 382/166 |
| 2014/0267822 A1 | 9/2014 | Roffet |
| 2014/0321561 A1 | 10/2014 | Stec et al. |
| 2014/0333673 A1 | 11/2014 | Cho et al. |
| 2014/0340434 A1 | 11/2014 | El-Ghoroury et al. |
| 2014/0341272 A1* | 11/2014 | Miller .................... H04N 5/202 375/240.02 |
| 2014/0369409 A1* | 12/2014 | Su ....................... H04N 19/119 375/240.12 |
| 2015/0016735 A1 | 1/2015 | Kikuchi |
| 2015/0042890 A1* | 2/2015 | Messmer ................ H04N 5/20 348/725 |
| 2015/0130967 A1* | 5/2015 | Pieper ................. H04N 5/2355 348/239 |
| 2015/0201222 A1* | 7/2015 | Mertens ................. H04N 19/46 382/233 |
| 2015/0243200 A1 | 8/2015 | Pan |
| 2015/0243243 A1 | 8/2015 | Greenebaum et al. |
| 2015/0245004 A1* | 8/2015 | Guo ....................... H04N 11/20 348/453 |
| 2015/0245043 A1 | 8/2015 | Greenebaum et al. |
| 2015/0245044 A1 | 8/2015 | Guo et al. |
| 2015/0358646 A1 | 12/2015 | Mertens |
| 2016/0156965 A1 | 6/2016 | Oh et al. |
| 2018/0276801 A1* | 9/2018 | Stessen ................... H04N 9/64 |
| 2018/0352225 A1* | 12/2018 | Guo ..................... H04N 19/117 |
| 2019/0182487 A1 | 6/2019 | Guo et al. |
| 2019/0289305 A1* | 9/2019 | Messmer ............. H04N 21/235 |

FOREIGN PATENT DOCUMENTS

| | | |
|---|---|---|
| CN | 102422322 | 4/2012 |
| CN | 103262535 | 8/2013 |
| CN | 103563347 | 2/2014 |
| EP | 1827024 | 2/2007 |
| EP | 1827024 | 8/2007 |
| JP | 2002-542739 | 12/2002 |
| JP | 2002542739 | 12/2002 |
| JP | 2008501261 | 1/2008 |
| JP | 2013517723 | 5/2013 |
| JP | 2013-545371 | 12/2013 |
| JP | 2014518030 | 9/2014 |
| KR | 1020010034185 | 4/2001 |
| KR | 10-2013-0084670 | 7/2013 |
| WO | 2007026283 | 3/2007 |
| WO | 2012122425 | 9/2012 |
| WO | WO 2012147022 | 11/2012 |
| WO | 2012166382 | 12/2012 |
| WO | 2012177575 | 12/2012 |
| WO | WO 2013046096 | 4/2013 |
| WO | 2014135901 | 9/2014 |
| WO | 2015007505 | 1/2015 |

OTHER PUBLICATIONS

Bordes Philippe, et al, "Color Gamut Scalable Video Coding for SHVC," 2013 Picture Coding Symposium (PCS), IEEE, Dec. 8, 2013, pp. 301-304.
Sebastien Lasserre, et al., "High Dynamic Range Video Coding," Joint Collaborative Team on Video Coding (JCT-VC), 16th Meeting, Jan. 9-17, 2014, pp. 1-8.
U.S. Appl. No. 14/631,401, dated Feb. 25, 2015, Haitao Guo.
U.S. Appl. No. 14/631,398, filed Feb. 25, 2015, Kenneth I. Greenebaum.
U.S. Appl. No. 14/631,394, filed Feb. 25, 2015, Kenneth I. Greenebaum.
U.S. Appl. No. 14/631,405, filed Feb. 25, 2015, Hao Pan.
Partial International Search Report from PCT/US2015/017536, dated May 21, 2015, Apple Inc., pp. 1-8.
Bordes Philippe, et al., "Color Gamut Scalable Video Coding for SHVC", 2013 Picture Coding Symposium (PCS), IEEE, Dec. 8, 2013 (Dec. 8, 2013), pp. 301-304.
International Search Report and Written Opinion from PCT/US2015/017539, dated May 20, 2015, Apple Inc., pp. 1-4.

(56) References Cited

OTHER PUBLICATIONS

International Written Opinion from PCT/US2015/017539, dated Feb. 25, 2015, Apple Inc., pp. 1-6.
International Search Report and Written Opinion from PCT/US2015/017540, dated May 15, 2015, Apple Inc., pp. 1-6.
Herbert Thoma: "The adaptive LogLUV transfrom for mapping HOR video to traditional video codecs", 106. MPEG Meeting; Oct. 28, 2013-Nov. 1, 2013; Geneva; (Motion Picture Expert Group or ISO/IEC JTC1/SC29/WG11 ), No. M31308, Oct. 23, 2013, XP030059761, pp. 1-6.
Jens-Uwe Garbas et al: "Temporally coherent luminance-to-luma mapping for high dynamic range video coding with H.264/AVC", IEEE International Conference on Acoustics, Speech and Signal Processing, May 22, 2011, pp. 829-832.
Lauga Paul et al: "Segmentation-based optimized tone mapping for high dynamic range image and video coding", Picture Coding Symposium, Dec. 8, 2013, pp. 257-260.
Lasserre S et al: "High Dynamic Range video coding", 16. JCT-VG Meeting; Jan. 9-17, 2014; San Jose; (Joint Collaborative Team on Video Coding of ISO/IEC JTC1/SC29/WG11 and ITU-T SG. 16 ); URL: hhtp://wftp3.itu.int/av-arch/jctvc-site/, No. JCTVC-P0159, Jan. 5, 2014, pp. 1-9.
Fogg (Harmonic) C et al: "Indication of SMPTE 2084, 2085 and carriage of 2086 metadata in HEVC", 16. JCT-VC Meeting, Jan. 9-17, 2014, http://wftp3.itu.int/av-arch/jctvc-site/, No. JCTVC-P0084-v2, pp. 1-5.
Segall A et al: "Tone mapping SEI Message", 19. JVY Meeting; Mar. 31-Jul. 4, 20061 Geneva, CH; (Joint Videoteam of ISO/IEC/ JTC1/SC29/WG11 and ITU-T SG. 16 ), No. JVT-S087, Apr. 1, 2006, pp. 1-12.
Yasir Salih et al: "Tone mapping of HDR images: A review", IEEE International Conference on Intelligent and Advanced Systems, Jun. 12, 2012, pp. 368-373.
Boyce J et al: "High level syntax hooks for future extensions", 8. JCT-VC Meeting; 99. MPEG Meeting; Jan. 2-Oct. 2, 2012; San Jose; (Joint Collaborative Team on Video Coding of ISO/IEC JTC1/SC29/WG11 and ITU-T SG.16 ); URL: http://wftp3.itu.int/av-arch.jctvc-site/, No. JCTVC-H0388, Jan. 21, 2012, pp. 1-8.
International Written Opinion from PCT/US2015/017540, dated Feb. 25, 2014, Apple, pp. 1-13.
Office Action from Australian Application No. 2015223123, dated Jul. 27, 2017, Apple Inc., pp. 1-7.
Office Action from Japanese Application No. 2016/548661, dated Oct. 6, 2017, Apple Inc., pp. 1-8.
Pavel Kosenko, "How to use curves", Retrieved from URL: https://pavelkosenko.wordpress.com/2012/04/01/how-to-use-curves/, pp. 1-27.
Ajit Motra, et al., "An Adaptive LogLuv Transform for High Dynamic Range Video Compression", Proceeding of 2010 IEEE 17th International Conference on Image Processing, Sep. 26-29, 2010, pp. 2061-2064.
Examination Report from Australian Application No. 2015223123, Apple Inc., dated Mar. 16, 2018, pp. 1-7.
Office Action from Korean Application No. 10-2018-7025884, Apple Inc., dated Oct. 2, 2018, pp. 1-10.
Office Action from Chinese Application No. 201580010103.9, (English Translation and Chinese Version) dated Apr. 26, 2019, pp. 1-13.
Office Action from Korean Application No. 10-2018-7025884, (Korean Version), dated Jun. 24, 2019, pp. 1-2.
Jens-Uwe Garbas et al, "Temporally Coherent Luminance-To-Lum—a Mapping for High Dynamic Range Video Coding with H.264/AVC", dated Jul. 12, 2011, pp. 1-5.
Office Action from Japanese Application No. 2018146796, dated Aug. 9, 2019, pp. 1-4.
Larson, "Overcoming Gamut and Dynamic Range Limitations in Digital Images," Color Imaging Conference, 1998.
Mantiuk, "High Dynamic Range Imaging: Towards the Limits of the Human Visual Perception," Forschung and wissenschaftliches Rechnen, 2006, 72:11-27.
Wikipedia.org [online], "High-dynamic-range imaging," last revised Feb. 17, 2020, retrieved on Mar. 5, 2020, retrieved from URL<https://en.wikipedia.org/w/index.php?title=High-dynamic-range_imaging&oldid=595943247;>, 12 pages.

\* cited by examiner

ADAPTIVE TRANSFER FUNCTION FOR VIDEO ENCODING AND DECODING

PRIORITY INFORMATION

This application claims benefit of priority of U.S. Provisional Application Ser. No. 61/944,484 entitled "DISPLAY PROCESSING METHODS AND APPARATUS" filed Feb. 25, 2014, the content of which is incorporated by reference herein in its entirety, to U.S. Provisional Application Ser. No. 61/946,638 entitled "DISPLAY PROCESSING METHODS AND APPARATUS" filed Feb. 28, 2014, the content of which is incorporated by reference herein in its entirety, and to U.S. Provisional Application Ser. No. 61/946,633 entitled "ADAPTIVE METHODS AND APPARATUS" filed Feb. 28, 2014, the content of which is incorporated by reference herein in its entirety.

BACKGROUND

Technical Field

This disclosure relates generally to digital video or image processing and display.

Description of the Related Art

Various devices including but not limited to personal computer systems, desktop computer systems, laptop and notebook computers, tablet or pad devices, digital cameras, digital video recorders, and mobile phones or smart phones may include software and/or hardware that may implement video processing method(s). For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources according to one or more video processing methods and output the processed video frames to one or more destinations.

As an example, a video encoder may be implemented as an apparatus, or alternatively as a software program, in which digital video input is encoded or converted into another format according to a video encoding method, for example a compressed video format such as H.264/Advanced Video Coding (AVC) format, or H.265 High Efficiency Video Coding (HEVC) format. As another example, a video decoder may be implemented as an apparatus, or alternatively as a software program, in which video in a compressed video format such as AVC or HEVC is received and decoded or converted into another (decompressed) format according to a video decoding method, for example a display format used by a display device. The H.264/AVC standard is published by ITU-T in a document titled "ITU-T Recommendation H.264: Advanced video coding for generic audiovisual services". The H.265/HEVC standard is published by ITU-T in a document titled "ITU-T Recommendation H.265: High Efficiency Video Coding".

In many systems, an apparatus or software program may implement both a video encoder component and a video decoder component; such an apparatus or program is commonly referred to as a codec. Note that a codec may encode/decode both visual/image data and audio/sound data in a video stream.

Generally defined, dynamic range is the ratio between the largest and smallest possible values of a changeable quantity, such as in signals like sound and light. In digital image and video processing, extended or high dynamic range (HDR) imaging refers to technology and techniques that produce a wider range of luminance in electronic images (e.g., as displayed on display screens or devices) than is obtained using standard digital imaging technology and techniques (referred to as standard dynamic range, or SDR, imaging).

An electro-optical transfer function (EOTF) may map digital code values to light values, for example to luminance values. An inverse process, commonly referred to as an opto-electrical transfer function (OETF), maps light values to electronic/digital values. EOTFs and OETFs may collectively be referred to as transfer functions. The SI unit for luminance is candela per square meter ($cd/m^2$). A non-SI term for the same unit is "NIT". In standard dynamic range (SDR) imaging systems, to simplify the encoding and decoding processes in encoding/decoding systems or codecs, fixed transfer functions, for example fixed power-law gamma transfer functions, have generally been used for the internal representation of video image content. With the emergence of high dynamic range (HDR) imaging techniques, systems and displays, a need for more flexible transfer functions has emerged.

SUMMARY OF EMBODIMENTS

Embodiments of video encoding and decoding systems and methods are described that implement an adaptive transfer function for the representation of video image content internally within the video encoding and decoding system or codec. Embodiments may dynamically determine a focus dynamic range for a current scene, sequence, frame, or region of a frame in input video based on one or more characteristics of the image data (e.g., brightness, texture, etc.), crop the input video dynamic range into that focus range, and then appropriately map (e.g., quantize) the values in the cropped range from the bit depth of the input video to the bit depth of the codec according to a transfer function used to represent video data in the codec.

In embodiments, various transfer functions may be used to represent the input video data and the focus range video data in the codec. In some embodiments, the transfer function used to represent video data in the codec may be the same as the transfer function used to represent the input video data. In some embodiments, a different transfer function (referred to as an internal or secondary transfer function) may be used to represent the video data in the codec than the transfer function used to represent the input video data (referred to as the primary transfer function).

In embodiments, the focus range, transfer function, quantization parameters, and other format information used by the encoder for a scene, sequence, frame, or region may be signaled to a decoder component, for example by metadata embedded in the output bit stream. At the decoder, the encoded bit stream may be decoded and dynamically expanded to the full dynamic range of a target device such as a high dynamic range (HDR)-enabled display according to the signaled focus range(s) for scenes, sequences, frames, or regions of the video.

By dynamically adapting the transfer function to the input video data, embodiments may allow the video data to be represented with fewer bits in the codec than are used to represent the input video data, while also allowing the video data output by the codec to be expanded to fill the dynamic range of HDR devices such as HDR-enabled displays. Embodiments of an adaptive transfer function method may, for example, enable the video encoding and decoding systems to use 10 or fewer bits for the internal representation and processing of the video data within a codec, while representing the extended or high dynamic range of the video data, for example using 12 or more bits, when outputting the video to HDR devices such as HDR-enabled displays. Embodiments of an adaptive transfer function method for video encoding and decoding systems may thus simplify the implementation, and consequently the adoption, of HDR technology, especially in the consumer space.

Figure 1:
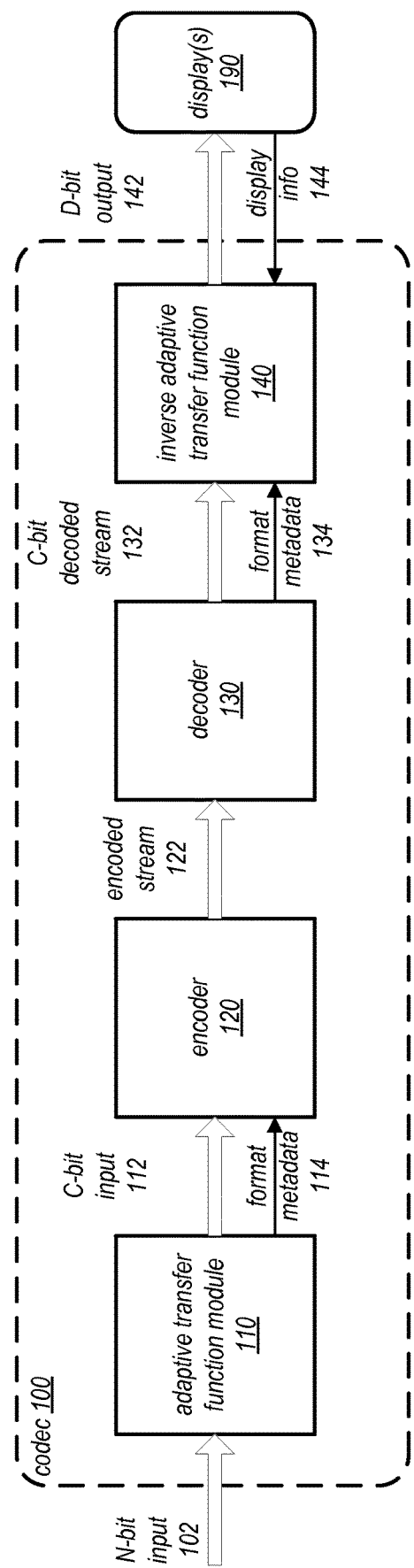
FIG. 1 illustrates an example codec or video encoding and decoding system that implements an embodiment of an adaptive transfer function.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION

Figure 2:
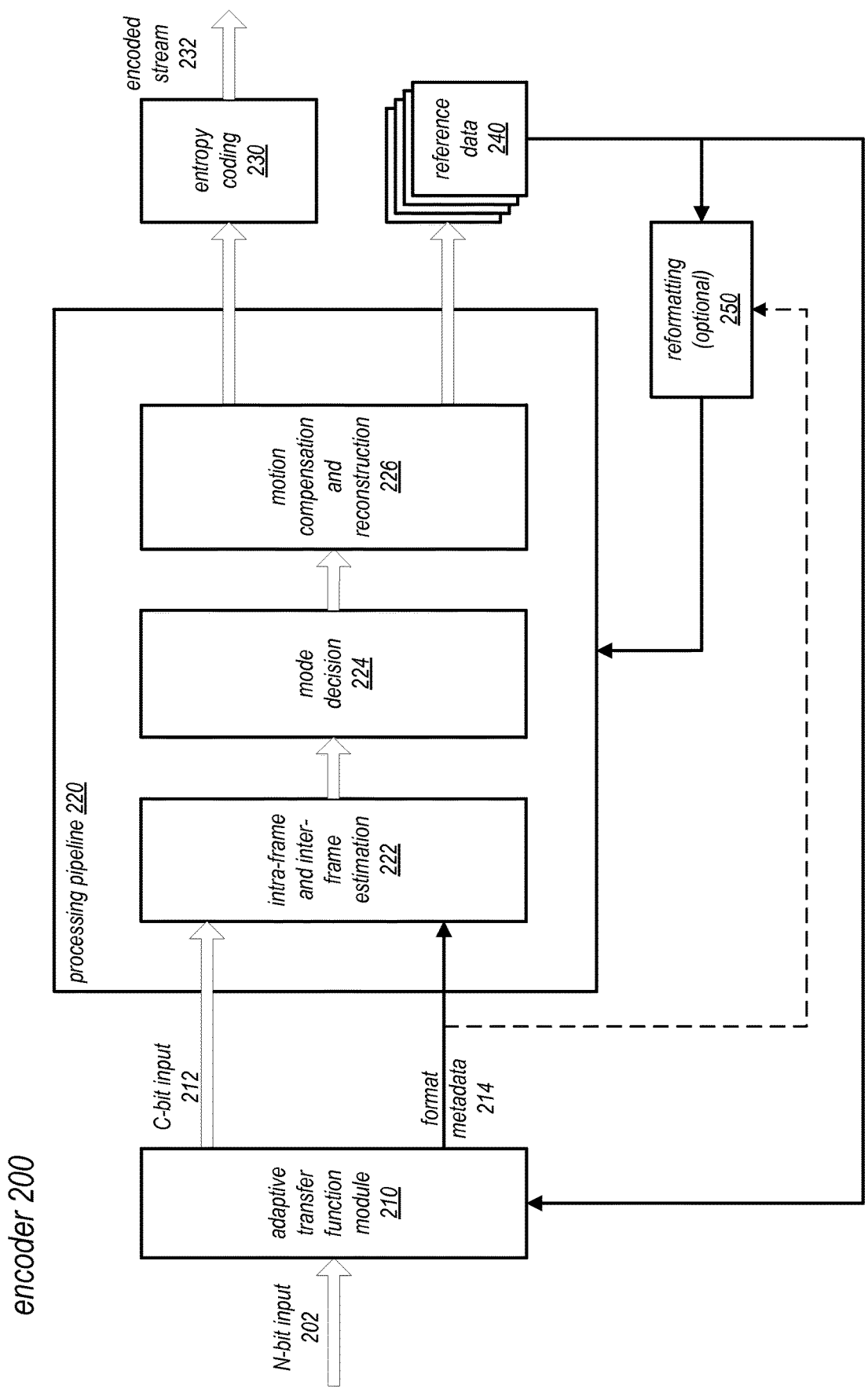
FIG. 2 illustrates an example encoder that applies an adaptive transfer function method to video input data and generates encoded video data, according to some embodiments.
Figure 3:
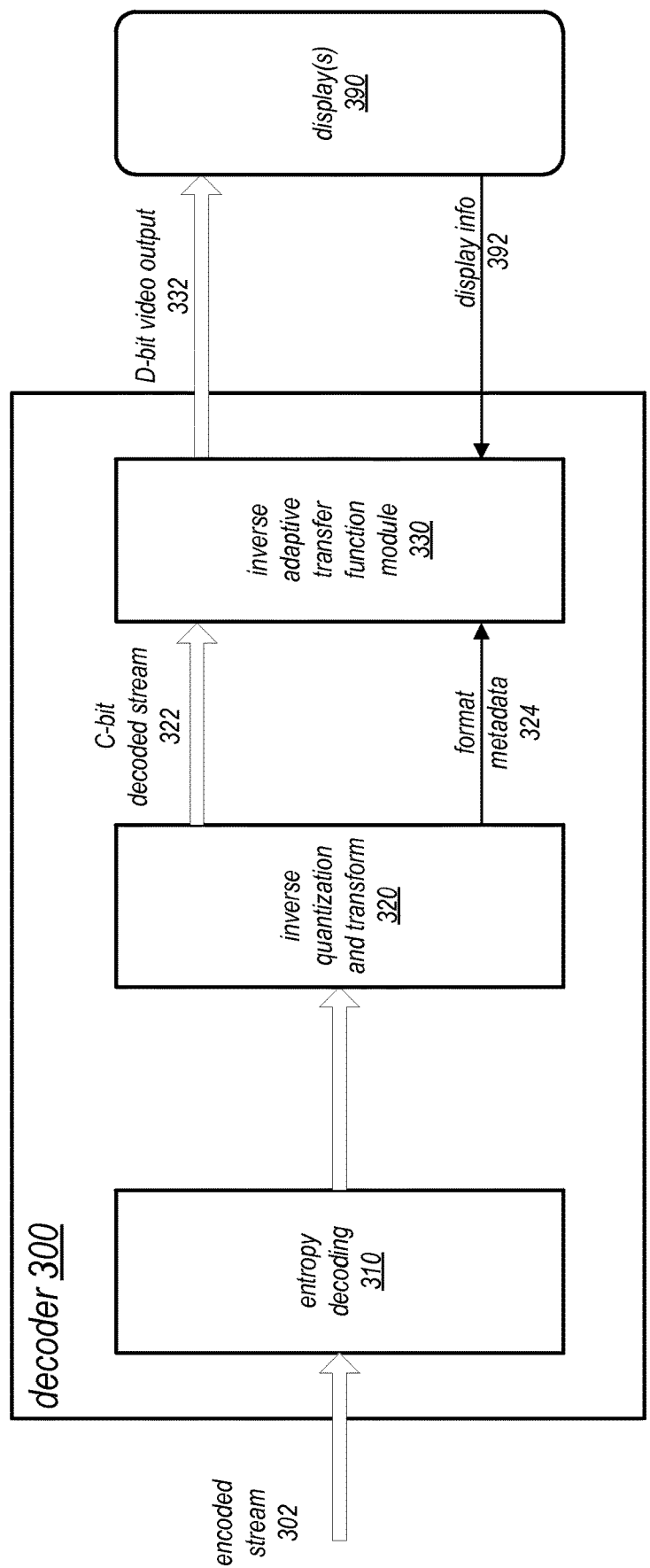
FIG. 3 illustrates an example decoder that decodes encoded video data and expands the decoded video data according to an adaptive transfer function method to generate display format video data, according to some embodiments.

Embodiments of video encoding and decoding systems and methods are described that implement an adaptive transfer function for the representation of video image content internally within the video encoding and decoding system or codec. Embodiments may allow the adaptation of the dynamic range of the input video data to the codec during the encoding and decoding processes. In embodiments, the transfer function may be dynamically adapted for each scene, sequence, or frame of input video to the codec. In some embodiments, the transfer function may be dynamically adapted within regions of a frame. Embodiments may dynamically adapt the transfer function to the input video data, keeping only the information within a dynamically determined effective dynamic range of the human visual system (referred to herein as a focus dynamic range, or just focus range) and mapping the data within the focus range from the bit depth of the input video into the bit depth of the codec according to a transfer function for processing within the codec. The output of the codec may be expanded to fill the dynamic range of output or target devices, including but not limited to extended or high dynamic range (HDR) devices such as HDR-enabled displays. FIGS. 1 through 3 illustrate example video encoding and decoding systems or codecs in which embodiments of the adaptive transfer function method may be implemented.

Figure 4:
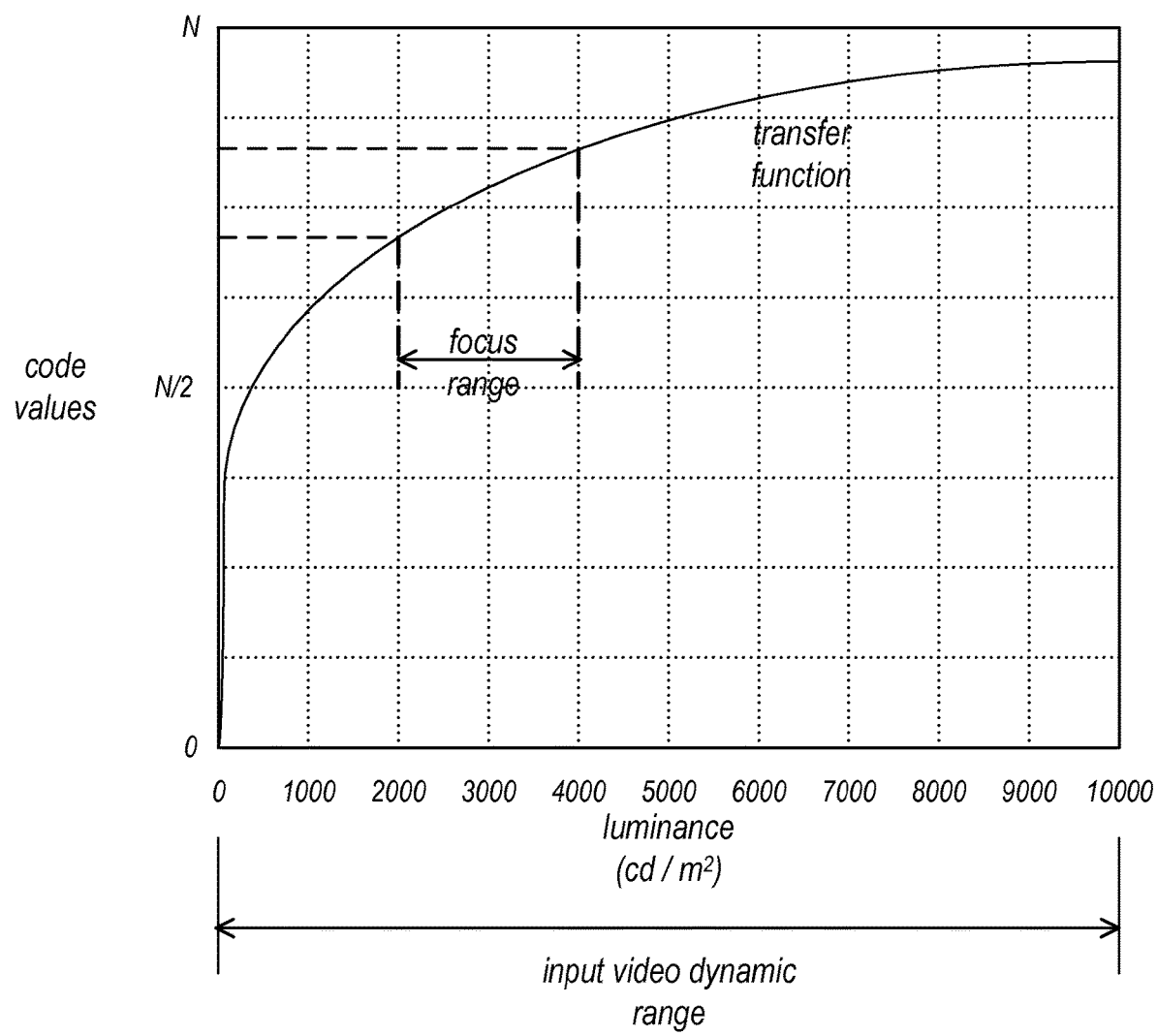
FIG. 4 illustrates an example full range for input video data and shows an example focus range for the video data, according to some embodiments.
Figure 5:
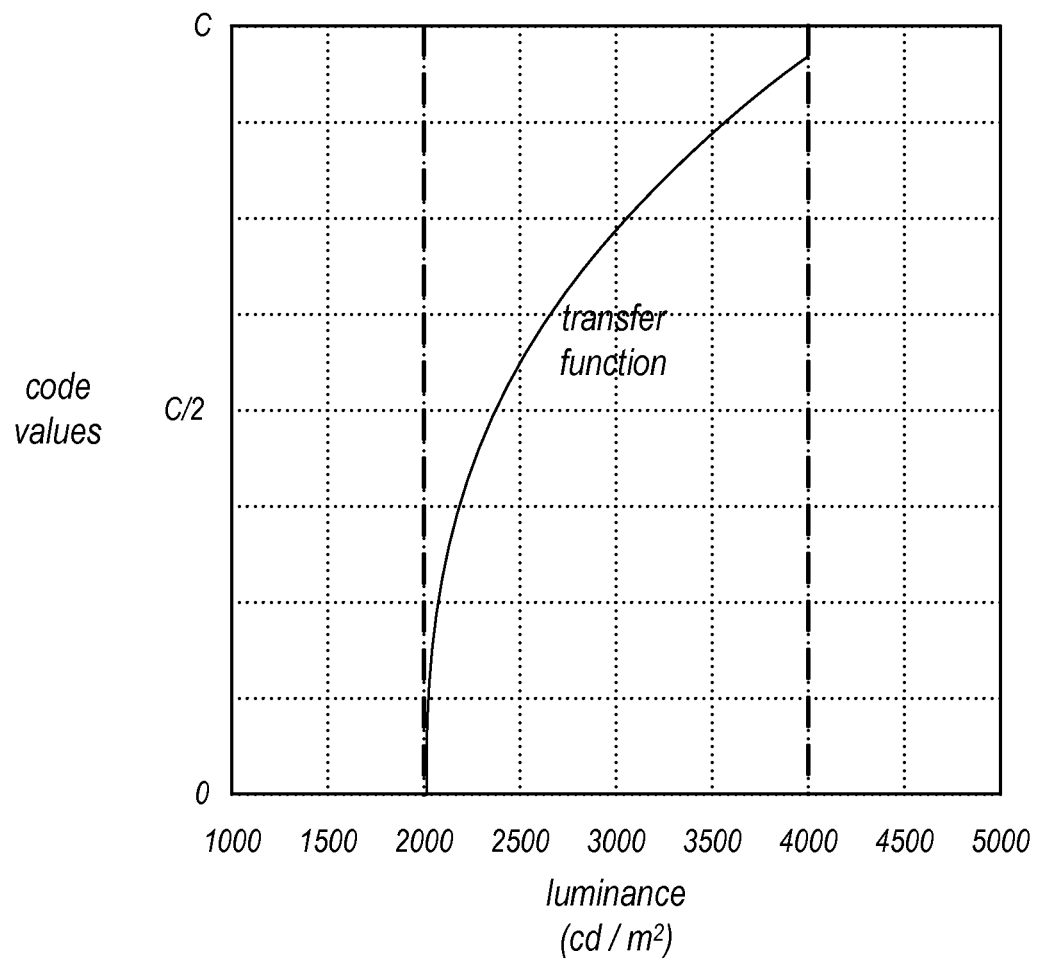
FIG. 5 illustrates an example of mapping N-bit input video data within a focus range to generate C-bit video data, according to some embodiments.

The human visual system covers a significant dynamic range as a total. However, the human visual system tends to adapt to and limit the dynamic range based on the current scene or image being viewed, for example according to brightness (luminance) and texture characteristics of the scene or image. Thus, even though the total dynamic range of the human visual system is relatively large, the effective dynamic range for a given scene, sequence, frame, or region of video may be considerably smaller depending on image characteristics including but not limited to brightness and texture. Embodiments of video encoding and decoding systems and methods as described herein may leverage this characteristic of human vision to employ a similar strategy for dynamically limiting the range within a codec according to characteristics of a current scene, sequence, frame, or region. In embodiments, depending on one or more characteristics (e.g., brightness, texture, etc.) of the current scene, sequence, frame, or region being processed, an encoder component or process may dynamically limit the range (e.g., luminance) of an input video scene, sequence, frame, or region within an effective dynamic range for the human visual system and within the requirements, e.g. bit depth, of the codec. This can be done, for example, by dynamically determining an area, in terms of sample values, within a current scene, sequence, frame, or region in input video, and focusing the bit depth of the codec (e.g., 10 bits) into that range. In some embodiments, this focusing may be performed in the encoder by cropping the input video dynamic range into that area, and then appropriately mapping (e.g., quantizing) the values in the cropped range (referred to as a focus dynamic range, or focus range) from the bit depth of the input video to the bit depth of the codec according to a transfer function used to represent video data in the codec. FIGS. 4 and 5 graphically illustrate an example focus range determined for input video data and a mapping of the N-bit input video data into the bit depth of the codec according to a transfer function, according to some embodiments. As used herein, N-bit refers to the bit depth of input video, C-bit refers to the bit depth used to represent video data within a codec, and D-bit refers to the bit depth of a target device for decoded video such as a display device.

In embodiments, various transfer functions may be used to represent the input video data and the focus range video data in the codec. Examples of transfer functions that may be used to represent video data in embodiments may include, but are not limited to, power law gamma-based transfer functions, log-based transfer functions, and transfer functions based on human visual perception such as the Perceptual Quantizer (PQ) transfer function proposed by Dolby Laboratories, Inc. In some embodiments, the transfer function used to represent video data in the codec may be the same as the transfer function used to represent the input video data. However, in other embodiments, a different transfer function (referred to as an internal or secondary transfer function) may be used to represent the video data in the codec than the transfer function used to represent the input video data (referred to as the primary transfer function). This may, for example, allow the video data, which may also be referred to as a video signal, to be represented with higher precision within the codec than could be done using the primary transfer function.

Figure 6:
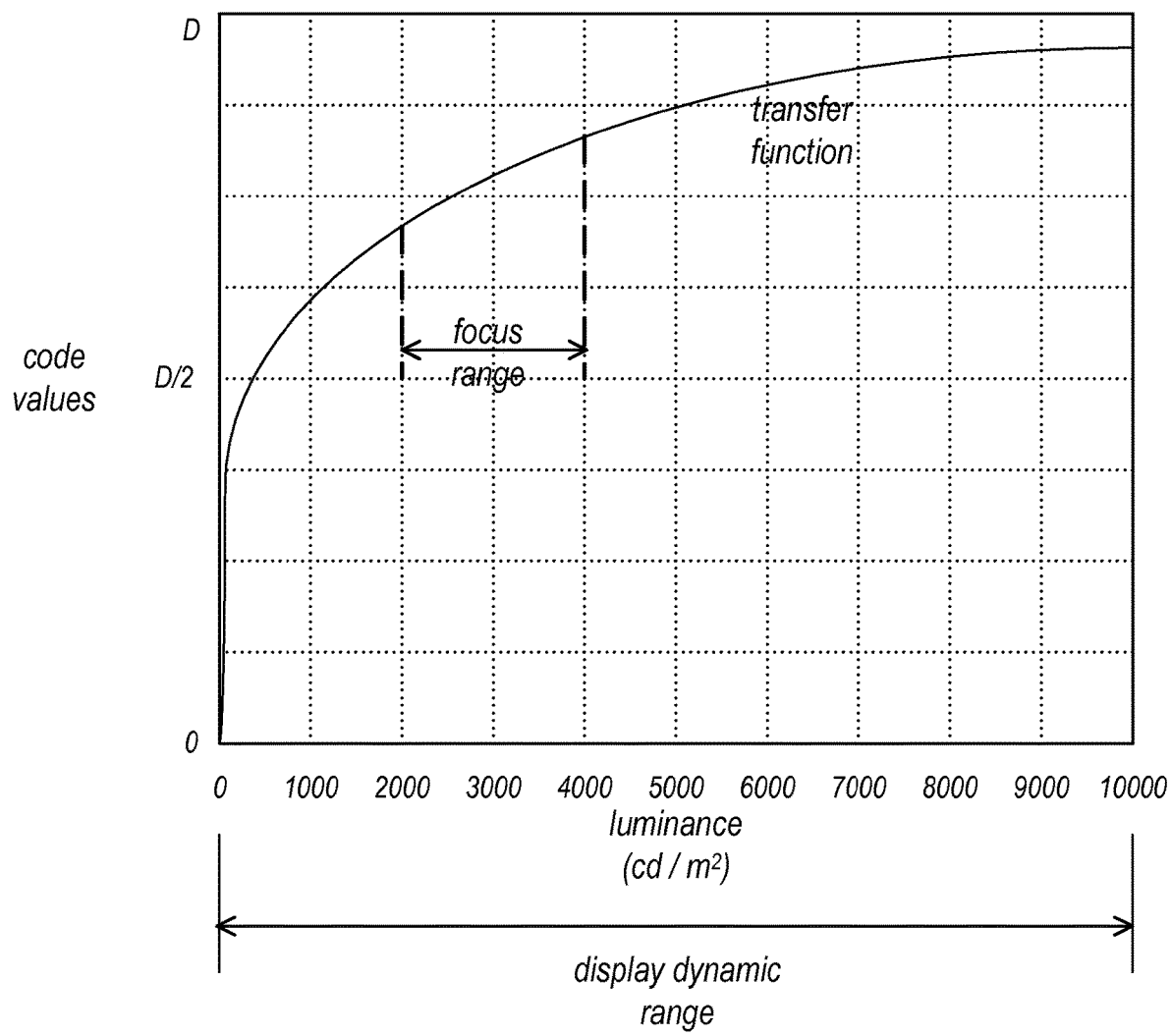
FIG. 6 graphically illustrates an example of expanding C-bit decoded video into the full dynamic range of an HDR-enabled device to generate D-bit video data for the device, according to some embodiments.

In embodiments, the focus range, transfer function, quantization parameters, and other format information used by the encoder for a scene, sequence, frame, or region may be signaled to a decoder component, for example by metadata embedded in the output bit stream. At the decoder, the encoded bit stream may be decoded and dynamically expanded to the full dynamic range of a target device such as an HDR device (e.g., an HDR-enabled display) according to the signaled focus range(s) for scenes, sequences, frames, or regions of the video. FIG. 6 graphically illustrates expanding decoded video data into the full dynamic range of an HDR device, according to some embodiments.

By dynamically adapting the transfer function to the input video data, embodiments may allow the video data to be represented with fewer bits in the codec than are used to represent the input video data, while also allowing the video data output by the codec to be expanded to fill the dynamic range of HDR devices such as HDR-enabled displays. Embodiments of an adaptive transfer function method may, for example, enable the video encoding and decoding systems to use 10 or fewer bits for the internal representation and processing of the video data within a codec, while representing the extended or high dynamic range of the video data, for example using 12 or more bits, when outputting the video to HDR devices such as HDR-enabled displays. Embodiments of an adaptive transfer function method for video encoding and decoding systems may thus simplify the implementation, and consequently the adoption, of HDR technology, especially in the consumer space.

The adaptive transfer function methods described herein may be applied to all color components of a video signal, or alternatively may be separately applied to one or both of the luminance (luma) and chrominance (chroma) components of the video signal.

FIG. 1 illustrates an example video encoding and decoding system or codec 100 that implements an embodiment of an adaptive transfer function. In embodiments, an adaptive transfer function 110 component or module of a codec 100 may convert N-bit (e.g., 12-bit, 14-bit, 16-bit, etc.) video input data 102 into C-bit (e.g., 10 or fewer bit) video input data 112 to an encoder 120 component or module of the codec 100 according to an adaptive transfer function method. In some embodiments, to convert the N-bit video input data 102 to C-bit video input data 112, the adaptive transfer function 110 may dynamically determine an area, in terms of sample values, within a current scene, sequence, frame, or region in the N-bit video input data 102, and focus the C bits into that area. In some embodiments, this focusing may be performed in the adaptive transfer function 110 by cropping the N-bit video input data 102 into the determined focus range, and then appropriately mapping (e.g., quantizing) the N-bit values in the focus range to the bit depth of the codec according to a transfer function used to represent video data in the encoder 120 to generate the C-bit video input data 112 to the encoder 120.

In some embodiments, the adaptive transfer function 110 may also generate format metadata 114 as output to the encoder 120. The format metadata 114 may describe the adaptive transfer function method as applied to the input video data 102. For example, the format metadata 114 may indicate the determined focus range, parameters used in mapping the video data into the bit depth of the encoder, and may also include information about the transfer function applied to the focus range.

In some embodiments, the encoder 120 may then encode the C-bit video input data 112 to generate an encoded stream 122 as output. In some embodiments, the encoder 120 may encode the C-bit video input data 112 according to a compressed video format such as H.264/Advanced Video Coding (AVC) format, or H.265/High Efficiency Video Coding (HEVC) format. However, other encoding formats may be used. In some embodiments, the encoder 120 may, for example, embed the format metadata 114 in the output stream 122 so that the format metadata 114 can be provided to a decoder 130 component. The output encoded stream 122 may be stored to a memory, or alternatively may be sent directly to a decoder 130 component or module of the codec 100. FIG. 2 illustrates an example encoder component of a video encoding and decoding system or codec 100 in more detail.

Decoder 130 may read or receive the encoded stream 122 and decode the stream 122 to generate a C-bit decoded stream 132 as output to an inverse adaptive transfer function 140 component or module of the codec 100. In some embodiments, format metadata 134 describing the adaptive transfer function method as applied to the input video data 102 by the adaptive transfer function 110 may be extracted from the input stream 122 and passed to the inverse adaptive transfer function 140. The inverse adaptive transfer function 140 may convert the C-bit decoded stream 132 according to the format metadata 134 and display information 144 to generate D-bit (e.g., 12-bit, 14-bit, 16-bit, etc.) HDR output 142 to one or more displays 190 or other devices. FIG. 3 illustrates an example decoder component of a video encoding and decoding system or codec 100 in more detail.

Embodiments of video encoding and decoding systems or codecs 100 that implement an adaptive transfer function method as described herein may, for example, be implemented in devices or systems that include one or more image capture devices and/or one or more display devices. An image capture device may be any device that includes an optical sensor or photosensor that is capable of capturing digital images or video. Image capture devices may include, but are not limited to, video cameras and still image cameras, as well as image capture devices that can capture both video and single images. Image capture devices may be stand-alone devices or may be cameras that are integrated into other devices including but not limited to smartphones, cellphones, PDAs, tablet or pad devices, multifunction devices, computing devices, laptop computers, notebook computers, netbook computers, desktop computers, and so on. Note that image capture devices may include small form factor cameras suitable for use in small devices such as cellphones, PDAs, and tablet devices. Displays or display devices may include display screens or panels that are integrated into other devices including but not limited to smartphones, cellphones, PDAs, tablet or pad devices, multifunction devices, computing devices, laptop computers, notebook computers, netbook computers, desktop computers, and so on. Display devices may also include video monitors, projectors, or in general any device that can display or project digital images and/or digital video. The displays or display devices may use LCD (liquid crystal display) technology, LPD (light emitting polymer display) technology, or LED (light emitting diode) technology, although other display technologies may be used.

Figure 10:
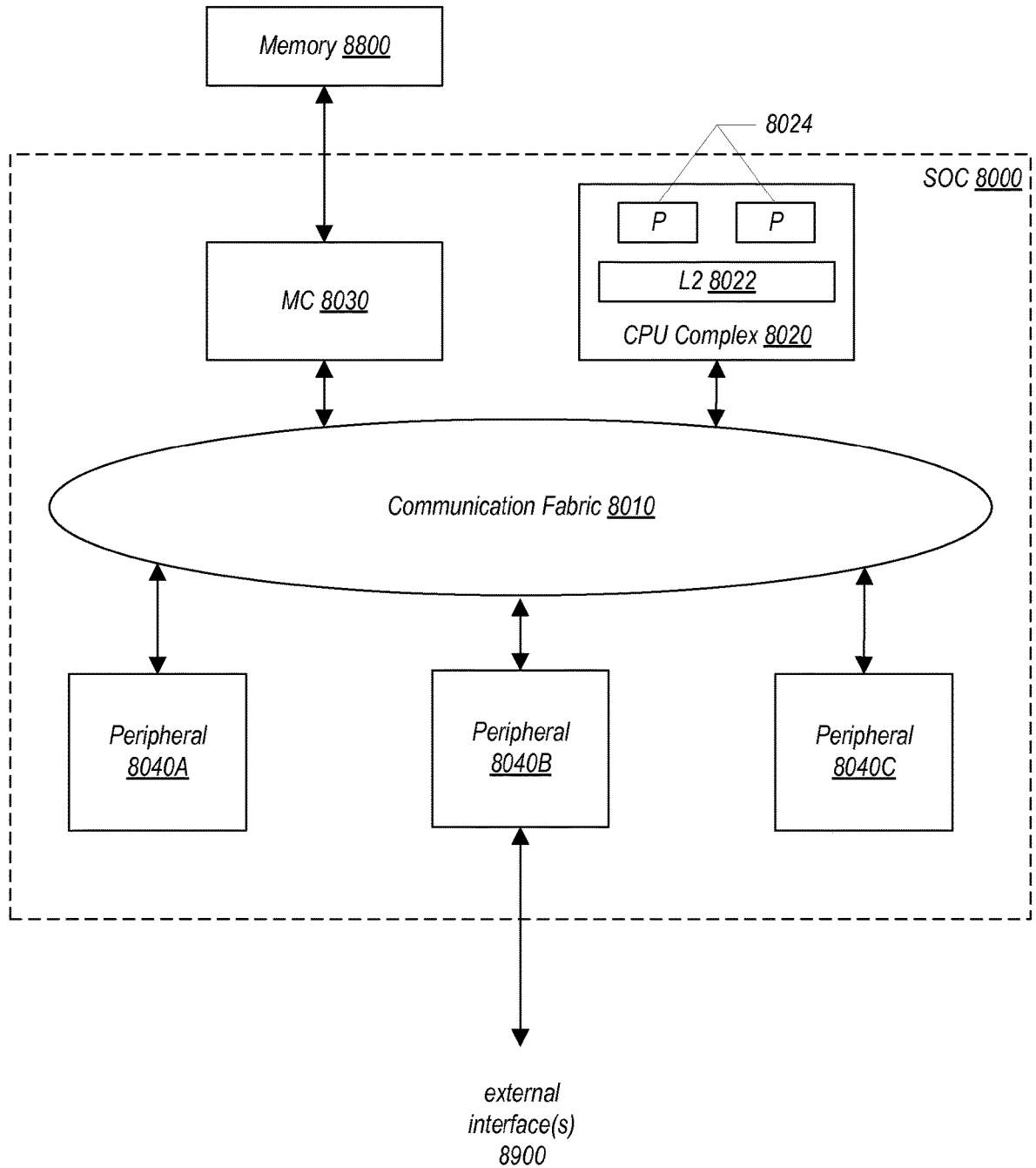
FIG. 10 is a block diagram of one embodiment of a system on a chip (SOC) that may be configured to implement aspects of the systems and methods described herein.
Figure 11:
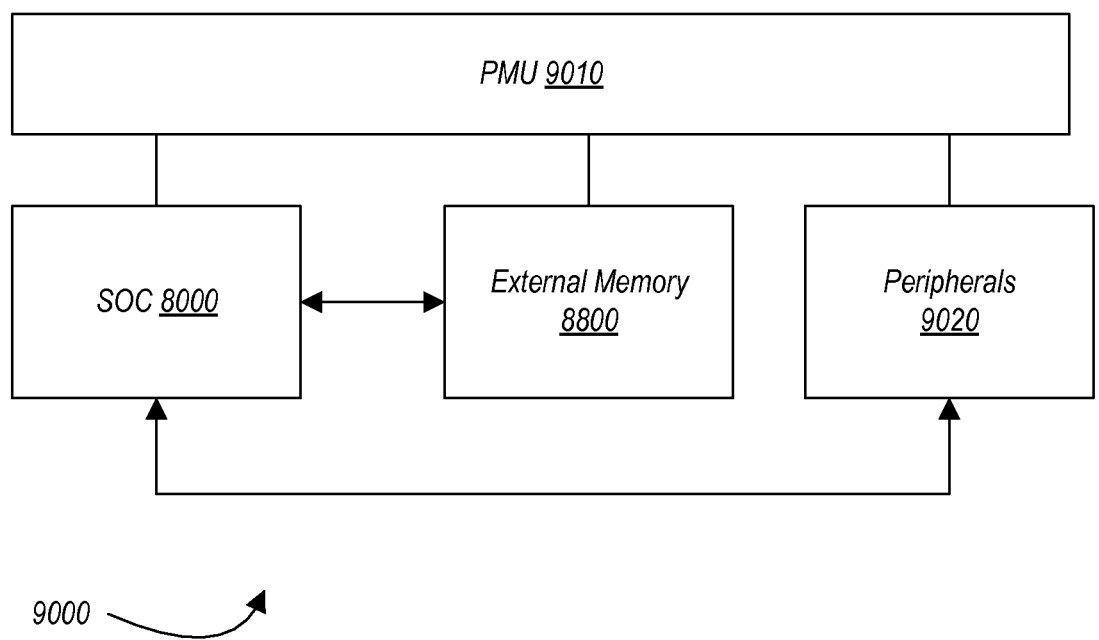
FIG. 11 is a block diagram of one embodiment of a system that may include one or more SOCs.
Figure 12:
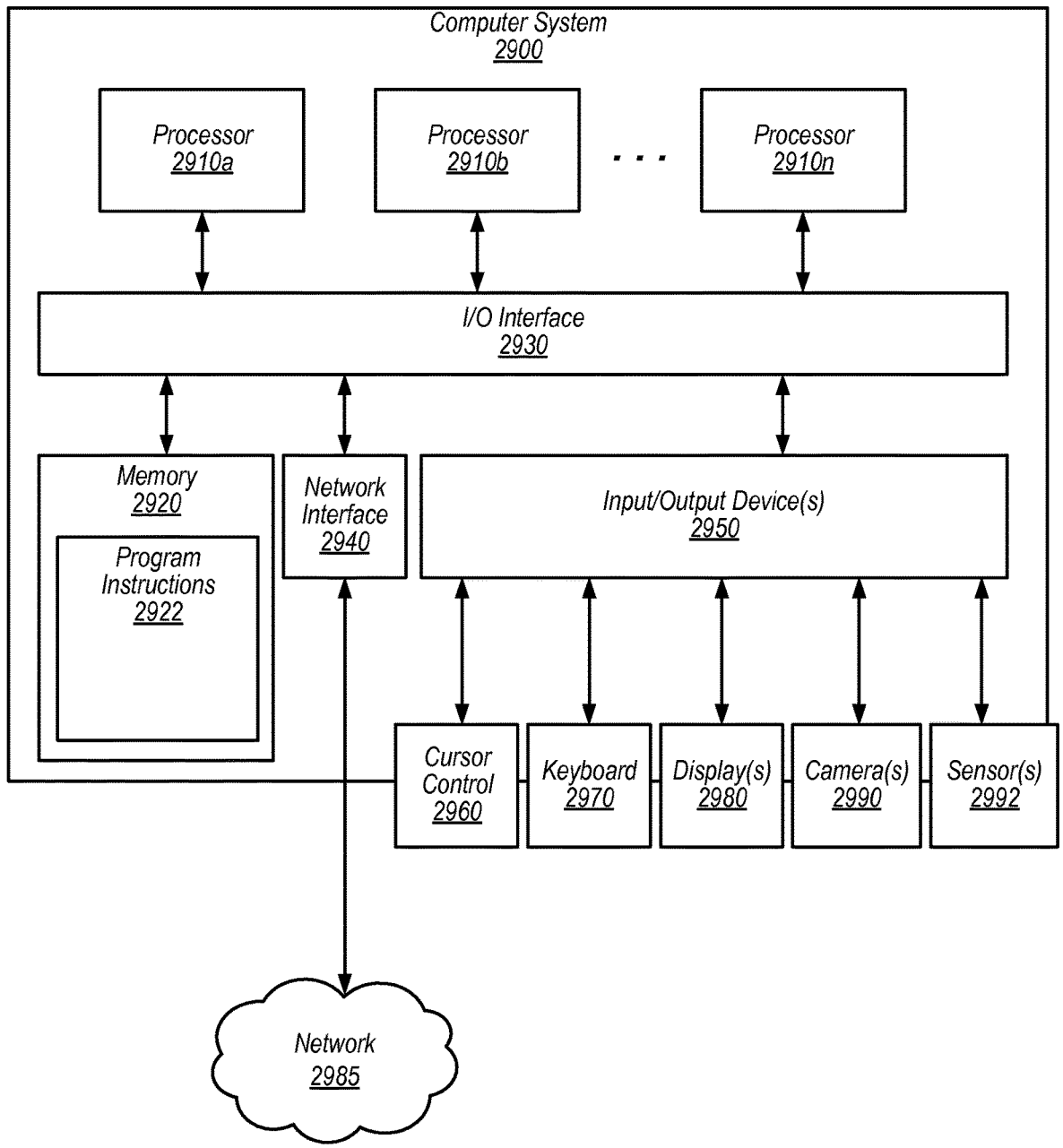
FIG. 12 illustrates an example computer system that may be configured to implement aspects of the systems and methods described herein, according to some embodiments.
Figure 13:
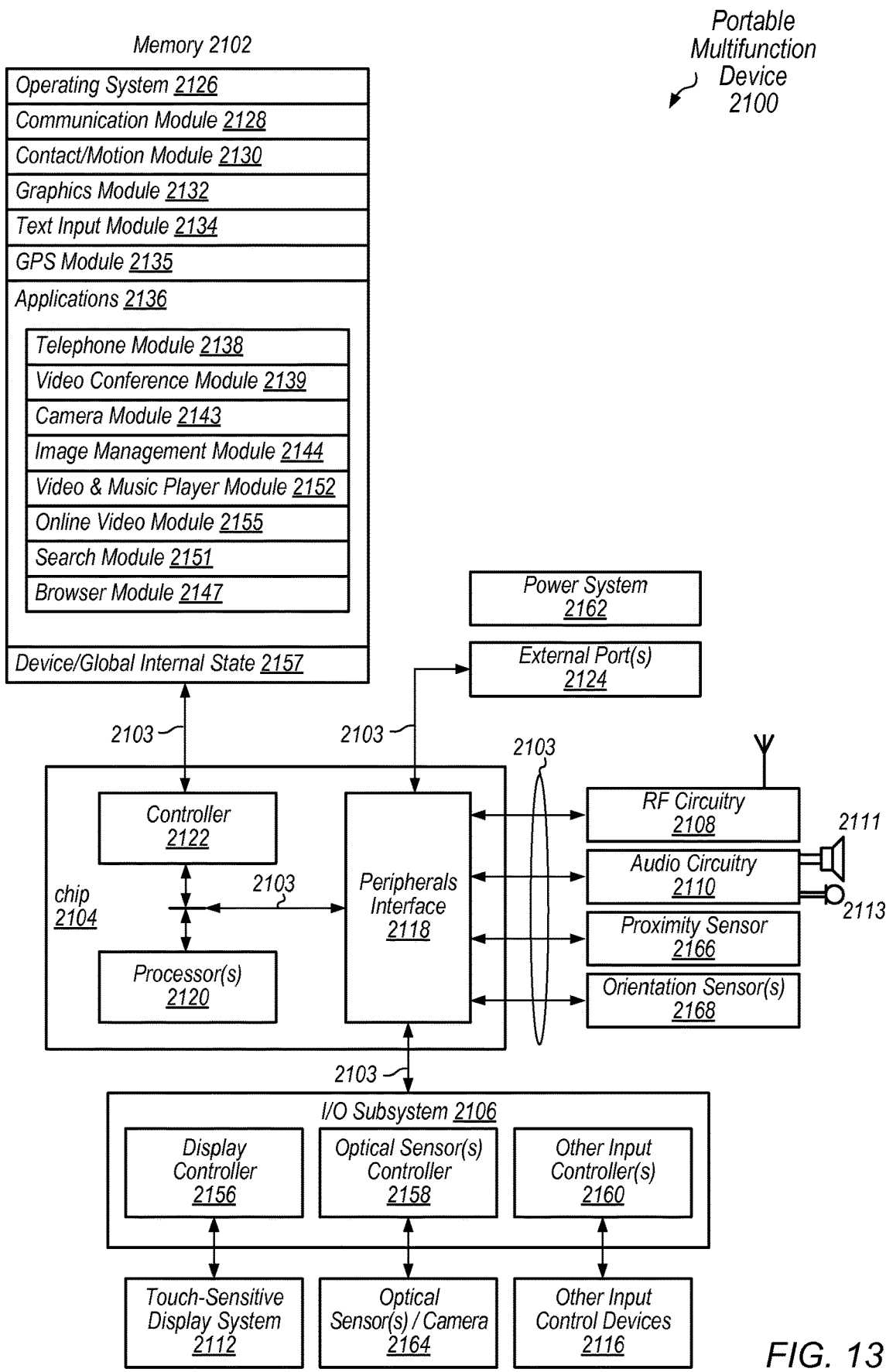
FIG. 13 illustrates a block diagram of a portable multifunction device in accordance with some embodiments.
Figure 14:
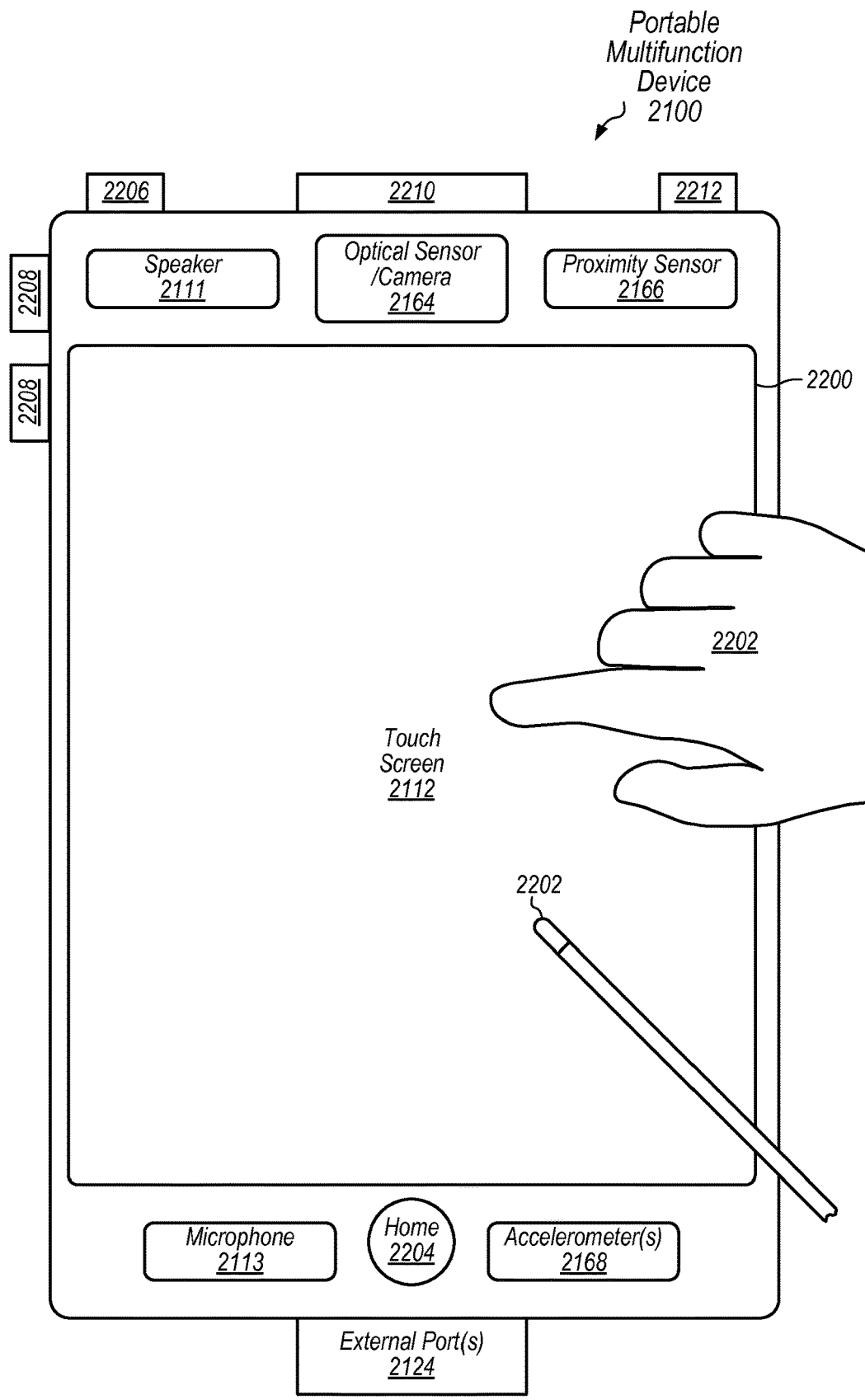
FIG. 14 depicts a portable multifunction device in accordance with some embodiments.

FIGS. 10 through 14 show non-limiting examples of devices in which embodiments may be implemented. A device or system that includes an image capture device and/or a display device may include hardware and/or software that implements at least some of the functionality for processing video data as described herein. In some embodiments, a portion of the functionality as described herein may be implemented on one device, while another portion may be implemented on another device. For example, in some embodiments, a device that includes an image capture device may implement a sensor pipeline that processes and compresses (i.e., encodes) images or video captured via a photosensor, while another device that includes a display panel or screen may implement a display pipeline that receives and processes the compressed images (i.e., decodes) for display to the panel or screen. In some embodiments, at least some of the functionality as described herein may be implemented by one or more components or modules of a system on a chip (SOC) that may be used in devices including but not limited to multifunction devices, smartphones, pad or tablet devices, and other portable computing devices such as laptop, notebook, and netbook computers. FIG. 10 illustrates an example SOC, and FIG. 11 illustrates an example device implementing an SOC. FIG. 12 illustrates an example computer system that may implement the methods and apparatus described herein. FIGS. 13 and 14 illustrate example multifunction devices that may implement the methods and apparatus described herein.

Embodiments are generally described herein as processing video. However, embodiments may be applied to process single or still images instead of or as well as video frames or sequences. Thus, when "video", "video frame", "frame", or the like is used herein, it is to be understood that the terms may refer to captured digital images in general.

FIG. 2 illustrates an example encoder 200 that applies an adaptive transfer function method to video input data 202 and generates encoded video data 232 as output, according to some embodiments. Encoder 200 may, for example, be a component or module of a codec 100 as illustrated in FIG. 1. In embodiments, an adaptive transfer function component or module 210 of the encoder 200 may convert N-bit (e.g., 12-bit, 14-bit, 16-bit, etc.) video input data 202 into C-bit (e.g., 10 or fewer bit) data 212 according to an adaptive transfer function method, and output the C-bit data 212 to a processing pipeline 220 component of the encoder 200. In some embodiments, to convert the N-bit video input data 202 to C-bit video data 212, the adaptive transfer function module 210 may dynamically determine an area, in terms of sample values, within a current scene, sequence, frame, or region in the N-bit video input data 202, and focus the C bits into that area. In some embodiments, this focusing may be performed in the adaptive transfer function module 210 by cropping the dynamic range of the N-bit video input data 202 into the determined focus range, and then appropriately mapping (e.g., quantizing) the N-bit values in the focus range to the C bits according to a transfer function used to represent video data in the encoder 200. In some embodiments, the adaptive transfer function module 210 may also generate format metadata 214 as output to the encoder 220. The format metadata 214 may describe the adaptive transfer function method as applied to the input video data 202. For example, the format metadata 214 may indicate the determined focus range parameters used in mapping the video data into the bit depth of the encoder, and may also include information about the transfer function applied to the focus range.

In some embodiments, the encoder 200 may then encode the C-bit video input data 212 generated by the adaptive transfer function module 210 to generate an encoded stream 232 as output. In some embodiments, the encoder 120 may encode the C-bit video input data 112 according to a compressed video format such as H.264/Advanced Video Coding (AVC) format, or H.265/High Efficiency Video Coding (HEVC) format. However, other encoding formats may be used.

In some embodiments, input video frames are subdivided into and processed in the encoder 200 according to blocks of picture elements (referred to as pixels, or pels). For example, 16×16 pixel blocks referred to as macroblocks may be used in H.264 encoding. HEVC encoding uses blocks referred to as Coding Tree Units (CTUs) that may vary within the range of 16×16 pixel to 64×64 pixel blocks. CTUs may be divided into coding units (CUs) and further subdivided to prediction units (PUs) that may can vary in size from 64×64 pixel down to 4×4 pixel blocks. In some embodiments, the video input data 212 may be separated into luma and chroma components, and the luma and chroma components may be processed separately at one or more components or stages of the encoder.

In the example encoder 200 shown in FIG. 2, the encoder 200 includes a processing pipeline 220 component and an entropy coding 230 component. The processing pipeline 220 may include multiple components or stages at which the video input data 212 is processed. A processing pipeline 220 may, for example, implement Intra-frame and inter-frame estimation 222, mode decision 224, and motion compensation and reconstruction 226 operations as one or more stages or components.

The following describes operations of an example processing pipeline 220 at a high level, and is not intended to be limiting. In some embodiments, intra-frame and inter-frame estimation 222 may determine blocks of previously encoded pixels to be used in encoding blocks input to the pipeline. In some video encoding techniques such as H.264 encoding, each input block can be encoded using blocks of pixels that are already encoded within the current frame. The process of determining these blocks may be referred to as intra-frame estimation, or simply intra-estimation. In some video encoding techniques such as H.264 and H.265 encoding, blocks may also be encoded using blocks of pixels from one or more previously reconstructed frames (referred to as reference frames, and shown as reference data 240 in FIG. 2). In some embodiments, reconstructed and encoded frames output by an encoder pipeline may be decoded and stored to the reference data 240 for use as reference frames. In some embodiments, the reference frames stored in reference data 240 that are used in reconstructing a current frame may include one or more reconstructed frames that occur temporally prior to the current frame in the video being processed and/or one or more reconstructed frames that occur temporally after the current frame in the video being processed. The process of finding matching pixel blocks in reference frames may be referred to as inter-frame estimation, or more generally as motion estimation. In some embodiments, mode decision 224 may receive output for a given block from intra-frame and inter-frame estimation 222 and determine a best prediction mode (e.g., inter-frame prediction or intra-frame prediction modes) and corresponding motion vectors for the block. This information is passed to motion compensation and reconstruction 226.

Operations of motion compensation and reconstruction 226 may depend on the best mode received from mode decision 224. If the best mode is inter-predicted, a motion compensation component obtains reference frame blocks corresponding to the motion vectors, and combines the blocks into prediction blocks. The motion compensation component then applies a weighted prediction to the prediction blocks to create a final block predictor that is passed to a reconstruction component. In weighted prediction, values from the reference data may be weighted according to one or more weighting parameters and shifted with an offset value to generate the prediction data that will be used in encoding the current block. If the best mode is intra-predicted, intra prediction is performed using one or more neighbor blocks to generate a prediction block for the current block being processed at this stage of the pipeline.

The reconstruction component performs block (e.g., macroblock) reconstruction operations for the current block according to the motion compensation output. Reconstruction operations may, for example, include forward transform and quantization (FTQ) operations. Motion compensation and reconstruction 226 may output the transformed and quantized data to an entropy coding 230 component of the encoder 200.

Entropy coding 230 component may, for example, apply an entropy coding technique to compress the transformed and quantized data output by the pipeline 220, generating an encoded output stream 232. Example entropy coding techniques that may be used may include, but are not limited to, Huffman coding techniques, CAVLC (context-adaptive variable-length coding) and CABAC (context-adaptive binary arithmetic coding). In some embodiments, the encoder 200 may embed the format metadata 214 in the encoded output stream 232 so that the format metadata 214 can be provided to a decoder. The output encoded stream 232 may be stored to a memory, or alternatively may be sent directly to a decoder component.

Reference data 240 may also be output by the pipeline 220 and stored to a memory. The reference data 240 may include, but is not limited to, one or more previously encoded frames (referred to as reference frames) that may, for example, be accessed in motion estimation and motion compensation and reconstruction operations of the pipeline 220.

In some embodiments, an encoder 200 may include a reformatting 250 component that may be configured to reformat reference frame data obtained from reference data 240 for use by the pipeline 220 components when processing a current frame. Reformatting 250 may, for example, involve converting the reference frame data from a focus range/transfer function used in encoding the reference frame to a focus range/transfer function that is being used in encoding the current frame. As an example, a focus range/transfer function mapping of luminance for a reference frame may go from a value of 0.05 $cd/m^2$ to 1000 $cd/m^2$ represented in C (e.g., 10) bits. For a current frame, the focus range may be expanded due to brighter image content; for example, the focus range may be expanded or increased to 2000 $cd/m^2$. The focus range/transfer function mapping of luminance for the current frame may thus be 0.05 $cd/m^2$ to 2000 $cd/m^2$. To use the reference frame data in the pipeline 220, for example in motion estimation operations, the reference frame data may be reformatted according the focus range/transfer function being used to encode the current frame by the reformatting 250 component.

In the example given, the reformatting 250 component may convert the reference frame data from the 0.05 $cd/m^2$ to 1000 $cd/m^2$ range at which it was reconstructed to the range from 0.05 $cd/m^2$ to 2000 $cd/m^2$ range being used for the current frame. In this example, since the reference frame only contains data from 0.05 $cd/m^2$ to 1000 $cd/m^2$, some code words in the C-bit representation of the reformatted reference data (e.g., code words representing values greater than 1000 $cd/m^2$) may not be used in the reformatted reference data. However, the values are mapped to the current focus range for use in prediction or other operations.

As shown by the arrow returning from reference data 240 to adaptive transfer function module 210, in some embodiments, adaptive transfer function module 210 may use adaptive transfer function information from one or more previously processed frames in determining a focus range/transfer function for a current frame to be processed in the pipeline 220.

FIG. 3 illustrates an example decoder 300 that decodes encoded video data 302 and expands the decoded video data 322 according to an adaptive transfer function method to generate display format video data 332, according to some embodiments. Decoder 300 may, for example, be a component or module of a codec 100 as illustrated in FIG. 1. In the example decoder 300 shown in FIG. 3, the decoder 300 includes an entropy decoding 310 component, an inverse quantization and transform 320 component, and an inverse adaptive transfer function module 330. Entropy decoding 310 component may, for example, apply an entropy decoding technique to decompress the encoded stream 302 output by an encoder such as encoder 200 shown in FIG. 2. The inverse quantization and transform 320 component performs inverse quantization and inverse transform operations on the data output by entropy decoding 310 to generate C-bit decoded stream 322 as output to an inverse adaptive transfer function module 330 of the decoder 300. In some embodiments, format metadata 324 describing the adaptive transfer function method as applied to the current scene, sequence, frame, or region may be extracted from the input stream 302 and passed to the inverse adaptive transfer function module 330. The inverse adaptive transfer function module 330 may expand the C-bit decoded stream 322 according to the format metadata 324 and display information 392 to generate D-bit (e.g., 12-bit, 14-bit, 16-bit, etc.) HDR output 332 to one or more displays 390 or other devices.

FIGS. 4 through 6 graphically illustrate determining an example focus range for N-bit input video data, a mapping of the input video data into the C bits available within a codec according to a transfer function, and expanding the decoded video into the full dynamic range of an HDR device to generate D-bit video data for the device, according to some embodiments.

FIG. 4 illustrates an example full dynamic range for N-bit input video data and shows an example focus range determined for the input video data, according to some embodiments. In FIG. 4, the vertical axis represents the N-bit (e.g., 12-bit, 14-bit, 16-bit, etc.) code values in the input video data. The horizontal axis represents a dynamic range for luminance in input video data, in this example, 0-10000 $cd/m^2$, where $cd/m^2$ (candela per square meter) is the SI unit for luminance. A non-SI term for the same unit is "NIT". The curve represents an example transfer function for the input video data. The focus range (in this example, 2000-4000 $cd/m^2$) represents an effective dynamic range of the human visual system determined for a current scene, sequence, frame, or region according to one or more characteristics (e.g., brightness, texture, etc.) of the respective video data. As can be seen, in this example, the focus range is represented by a fraction (approximately $\frac{1}{8}^{th}$) of the N-bit code values. Note that different focus ranges may be determined for different scenes, sequences, frames, or regions within a video stream, as illustrated in FIGS. 7A through 7C.

FIG. 5 illustrates an example of mapping N-bit input video data within a determined focus range to generate C-bit video data within the codec, according to some embodiments. In FIG. 5, the vertical axis represents the C-bit (e.g., 12-bit, 10-bit, 8-bit, etc.) code values available in the codec. The horizontal axis shows the focus range for luminance values (in this example, 2000-4000 $cd/m^2$) to be mapped to the C-bit code values. The curve represents an example transfer function used to represent the focus range data within the code. In some embodiments, the transfer function used to represent the video data in the codec may be the same transfer function used to represent the input video data. However, in other embodiments, a different transfer function (referred to as an internal or secondary transfer function) may be used to represent the video data in the codec than the transfer function used to represent the input video data (referred to as the primary transfer function). This may, for example, allow the focus range of the video signal to be represented with higher precision within the codec than could be done using the primary transfer function.

FIG. 6 illustrates an example of expanding C-bit decoded video into the dynamic range of an HDR-enabled device to generate D-bit video data for the device, according to some embodiments. In FIG. 6, the vertical axis represents the D-bit (e.g., 12-bit, 14-bit, 16-bit, etc.) code values in video data output from a decoder, such as decoder 300 as illustrated in FIG. 3. The horizontal axis represents a dynamic range for luminance supported by a display device to which the D-bit video data is output by the decoder; in this example, a dynamic range of 0-10000 $cd/m^2$ is shown. The curve represents an example transfer function for the display device. After the encoded video signal is decoded by the decoder, the focus range used for the internal representation of the signal in the codec is remapped from the C-bit representation to the broader dynamic range and the D-bit representation of the display device. Note that different focus ranges may be encoded for different scenes, sequences, frames, or regions within a video stream, as illustrated in FIGS. 7A through 7C. In some embodiments, format metadata may be provided to the decoder in or with the encoded video stream that indicates the focus range used in encoding each scene, sequence, frame, or region. In some embodiments, the metadata may also include one or more parameters used in mapping the video data into the bit depth of the coded. In some embodiments, the metadata may also include information about an internal transfer function used to represent the focus range data in the codec. The metadata may be used by the decoder in remapping the focus range data from the C-bit representation to the broader dynamic range and the D-bit representation of the display device.

Figure 7A:
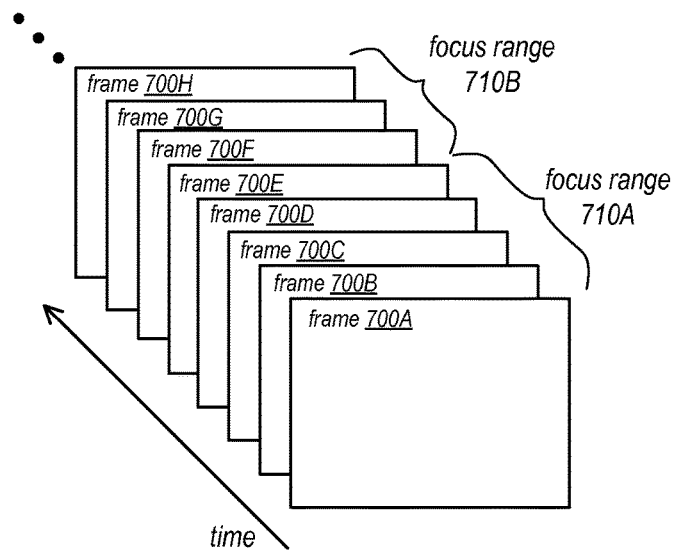
FIGS. 7A through 7C graphically illustrate applying different focus ranges to different portions of a video sequence or video frame according to embodiments of an adaptive transfer function method.
Figure 7B:
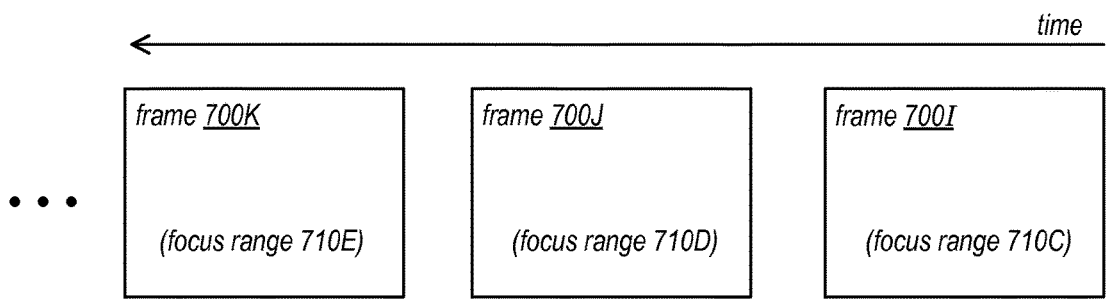
Figure 7C:
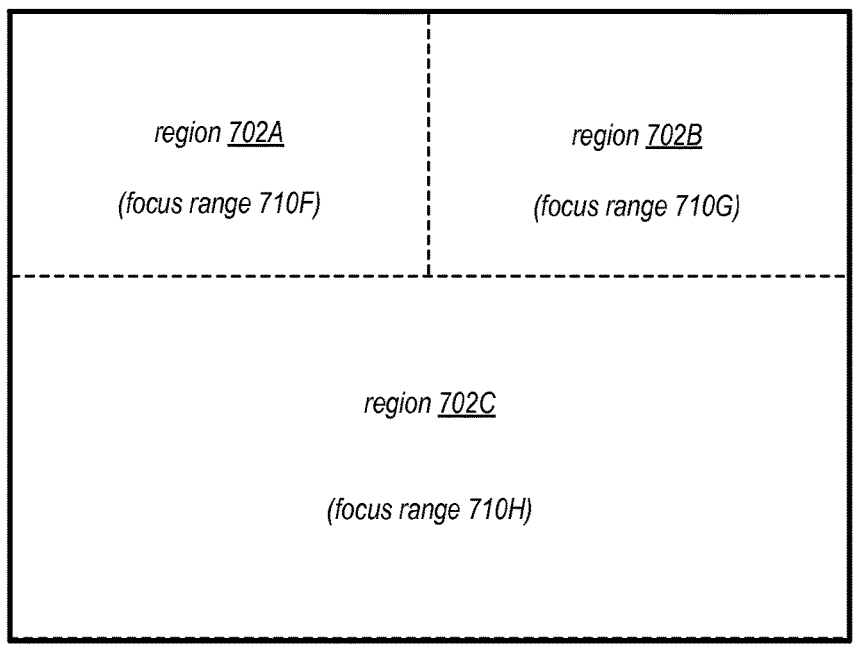

FIGS. 7A through 7C graphically illustrate applying different focus ranges to different portions of a video sequence or video frame according to embodiments of an adaptive transfer function method.

FIG. 7A graphically illustrates applying different focus ranges to different scenes or sequences of an input video according to some embodiments of an adaptive transfer function method. In this example, a focus range 710A is dynamically determined for and used in encoding frames 700A-700E, and a focus range 710B is dynamically determined for and used in encoding frames 700E-700G. Frames 700A-700E and frames 700E-700H may, for example, represent different scenes within a video, or may represent different sequences of frames within or across scenes in a video.

FIG. 7B graphically illustrates applying different focus ranges to each frame of an input video according to some embodiments of an adaptive transfer function method. In this example, a focus range 710C is dynamically determined for and used in encoding frame 700I, a focus range 710D is dynamically determined for and used in encoding frame 700J, and a focus range 710E is dynamically determined for and used in encoding frame 700K.

FIG. 7C graphically illustrates applying different focus ranges to different regions of a video frame according to some embodiments of an adaptive transfer function method. As shown in FIGS. 7A and 7B, in some embodiments, the adaptive transfer function method may be applied to a frame, scene, or sequence. However, in some embodiments, the adaptive transfer function method may instead or also be applied to two or more regions 702 within a frame, as shown in FIG. 7C. In this example, a focus range 710F is dynamically determined for and used in encoding a region 702A of a frame 700L, a focus range 710G is dynamically determined for and used in encoding a region 702B of the frame 700L, and a focus range 710H is dynamically determined for and used in encoding a region 702C of the frame 700L. In various embodiments, the regions 702 to be encoded according to the adaptive transfer function method may be rectangular, or may be of other shapes, including but not limited to arbitrarily determined, irregular shapes. In some embodiments, there may be a fixed number of regions 702 in each frame to be encoded according to the adaptive transfer function method. In some embodiments, the number of regions 702 and/or the shape of the regions 702 to be encoded according to the adaptive transfer function method may be determined for each frame, scene, or sequence. In some embodiments, the format metadata generated by the encoder and passed to the decoder may indicate the focus range, quantization parameters, and other information used to encode each region 702 in the frame(s) 700. In embodiments in which a secondary or internal transfer function is used within the codec, the format metadata may include information for converting from the secondary transfer function to the primary transfer function. In embodiments in which the number of regions 702 may vary, an indication of the actual number of regions 702 may be included in the metadata passed to the decoder. In some embodiments, coordinates and shape information for the regions 702 may also be included in the metadata passed to the decoder.

In video content, from one region or frame to the next region or frame in an input video being processed, the various parameters used in the adaptive transfer function method (e.g., focus range, quantization parameters, etc.) may be similar, particularly within a scene. Thus, in some embodiments, the adaptive transfer function method may provide intra-frame (spatial) and/or inter-frame (temporal) prediction of one or more of these adaptive transfer function parameters in the encoder, for example by leveraging a weighted prediction process in codecs such as AVC and HEVC codecs. In inter-frame (temporal) prediction, previously processed reference data from one or more temporally past or future frames may be used in predicting one or more of the parameters for content in a current frame. In intra-frame (spatial) prediction, data from one or more neighbor blocks or regions within a frame may be used in predicting one or more of the parameters for content in a current block or region.

Figure 8:
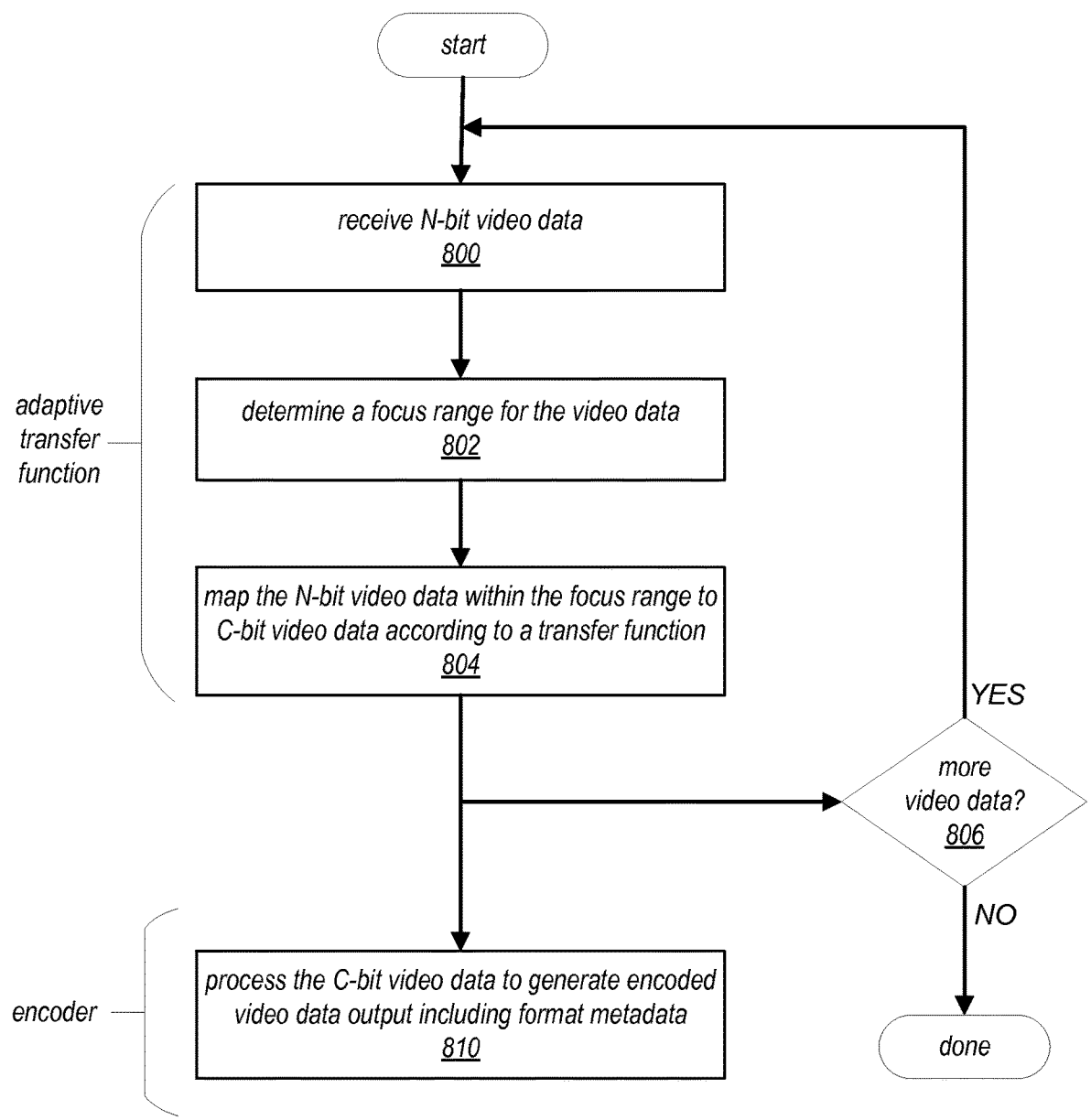
FIG. 8 is a flowchart of a video encoding method that applies an adaptive transfer function method to video input data and generates encoded video data, according to some embodiments.

FIG. 8 is a high-level flowchart of a video encoding method that applies an adaptive transfer function method to video input data and generates encoded video data, according to some embodiments. As indicated at 800 of FIG. 8, N-bit (e.g., 12-bit, 14-bit, 16-bit, etc.) video data may be received for encoding. In some embodiments, the frames of a video stream are processed sequentially by an encoder. In some embodiments, the input video frames are subdivided into and processed by the encoder according to blocks of pixels (e.g. macroblocks, CUs, PUs, or CTUs).

As indicated at 802 of FIG. 8, a focus range may be determined for the input video data. In some embodiments, the focus range may be dynamically determined for each scene, sequence, or frame of video input to the encoder. In some embodiments, the focus range may be dynamically determined for each of two or more regions within a frame. In some embodiments, the focus range may be determined according to one or more characteristics (e.g., brightness, texture, etc.) of the current scene, sequence, frame, or region being processed. The focus range represents an effective dynamic range of the human visual system for the image data (e.g., luminance) in the current scene, sequence, frame, or region. For example, if the dynamic range for luminance in the input video data is 0-10000 $cd/m^2$, example focus ranges based on particular characteristics of various scenes, sequences, frames, or regions may be 2000-4000 $cd/m^2$, 0-1000 $cd/m^2$, 1000-2500 $cd/m^2$, and so on. FIG. 4 graphically illustrates an example focus range determined for N-bit input video data, according to some embodiments As indicated at 804 of FIG. 8, the N-bit video data within the focus range may be mapped to C-bit video data according to a transfer function. In some embodiments, the input video data may be cropped according to the determined focus range, and then the cropped data values may be appropriately mapped (e.g., quantized) into the available C bits in the encoder according to a transfer function used to represent video data in the encoder. FIG. 5 graphically illustrates an example mapping of N-bit input video data within an example focus range into the C bits available within an encoder according to a transfer function, according to some embodiments. In embodiments, various transfer functions may be used to represent the N-bit input video data and the C-bit video data in the encoder. Examples of transfer functions that may be used to represent video data in embodiments may include, but are not limited to, power law gamma-based transfer functions, log-based transfer functions, and transfer functions based on human visual perception such as a PQ transfer function. In some embodiments, the transfer function used to represent the C-bit video data in the encoder may be the same transfer function used to represent the N-bit input video data. However, in other embodiments, the input video data may be represented according to a primary transfer function, and a different (secondary) transfer function may be used to represent the video data in the encoder. The secondary transfer function may, for example, represent the video signal with higher precision within the encoder than would be possible using the primary transfer function.

As shown by element 806 of FIG. 8, the adaptive transfer function processing performed at elements 800 through 804 iterates as long as there is more N-bit input video data (e.g., scenes, sequences, frames, or regions) to be processed. Each unit of C-bit video data (e.g., scene sequence, frame, or region) that is output by the adaptive transfer function method at elements 800 through 804 is input to and processed by an encoder, as indicated at 810 of FIG. 8. As previously mentioned, in some embodiments, the N-bit input video data may be subdivided into and processed by an adaptive transfer function module or component and passed to the encoder as C-bit video data according to blocks of pixels (e.g. macroblocks, CUs, PUs, or CTUs).

As indicated at 810 of FIG. 8, one or more components of an encoder may process the C-bit video data to generate encoded (and compressed) video data output (e.g., CAVLC or CABAC output). In some embodiments, the encoder may encode the C-bit video input data according to a compressed video format such as H.264/AVC format, or H.265/HEVC format. However, other encoding formats may be used. In some embodiments, the focus range, transfer function, quantization parameters, and other format information used in encoding each scene, sequence, frame, or region may be embedded as metadata in the encoded output stream, or may be otherwise signaled to decoder(s). An example encoder for processing C-bit video data to generate an encoded output stream is illustrated by the encoder 200 FIG. 2. In some implementations, the encoded output stream including the metadata may be written to a memory, for example via direct memory access (DMA). In some implementations, instead of or in addition to writing the output stream and metadata to a memory, the encoded output stream and metadata may be sent directly to at least one decoder. The decoder may be implemented on the same device or apparatus as the encoder, or on a different device or apparatus.

Figure 9:
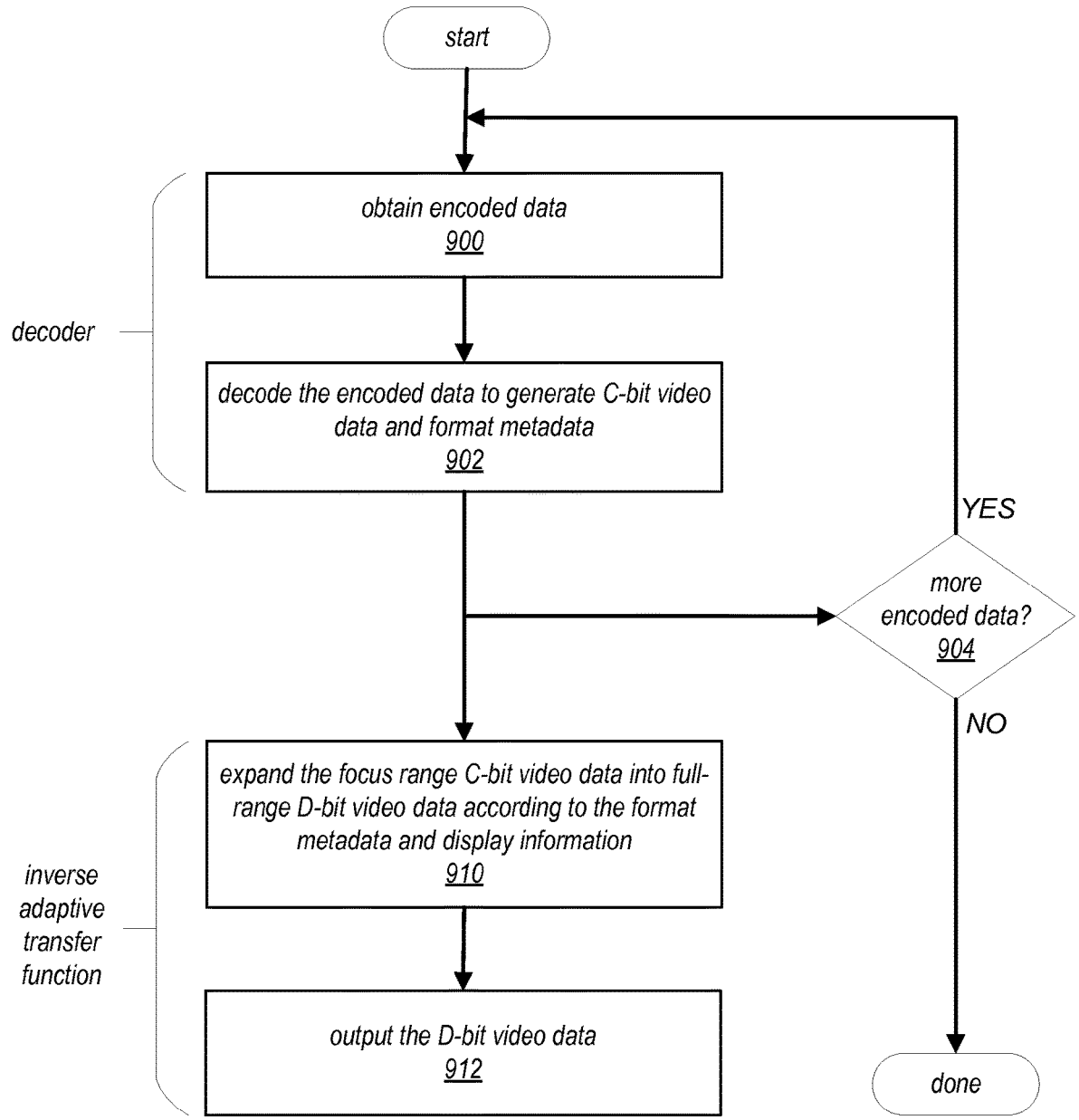
FIG. 9 is a flowchart of a video decoding method that decodes encoded video data and expands the decoded video data according to an adaptive transfer function method to generate display format video data, according to some embodiments.

FIG. 9 is a high-level flowchart of a video decoding method that decodes encoded video data and expands the decoded video data according to an adaptive transfer function method to generate display format video data, according to some embodiments. As indicated at 900 of FIG. 9, a decoder may obtain encoded data (e.g., CAVLC or CABAC encoded and compressed data). The encoded data may, for example, be read from a memory, received from an encoder, or otherwise obtained. As indicated at 902 of FIG. 9, the decoder may decode the encoded data to generate decoded C-bit video data and format metadata. In some embodiments, the decoder may decode the encoded data according to a compressed video format such as H.264/AVC format, or H.265/HEVC format. However, other encoding/decoding formats may be used. The format metadata extracted from the encoded data may, for example, include the focus range, transfer function, quantization parameters, and other format information that was used in encoding each scene, sequence, frame, or region.

As shown by element 904 of FIG. 9, the decoding performed at 900 and 902 may continue as long as there is encoded data. Each unit of decoded data (e.g., each scene sequence, frame, or region) that is decoded by the decoder may be output to and processed according to an inverse adaptive transfer function method, as indicated at 910 of FIG. 9. At least part of the format metadata extracted from the encoded data may also be output to the inverse adaptive transfer function method.

As indicated at 910 of FIG. 9, the inverse adaptive transfer function method may dynamically expand the decoded C-bit video data from the focus range to generate full dynamic range D-bit video data for output to a target device such as an HDR-enabled display device. For a given scene, sequence, frame, or region, the expansion may be dynamically performed according to respective format metadata extracted from the encoded data by the decoder. FIG. 6 graphically illustrates expanding decoded video data into the full dynamic range of an HDR device, according to some embodiments.

Primary and Secondary Transfer Functions

Examples of transfer functions that may be used to represent video data in embodiments of an adaptive transfer function method as described herein may include, but are not limited to, power law gamma-based transfer functions, logarithmic (log-based) transfer functions, and transfer functions based on human visual perception such as the Perceptual Quantizer (PQ) transfer function proposed by Dolby Laboratories, Inc.

In some embodiments, the transfer function used to represent video data in the codec may be the same as the transfer function used to represent the input video data (referred to as the primary transfer function). In these embodiments, the input video data may be cropped according to the determined focus range for a scene, sequence, frame, or region, and then mapped (e.g., quantized) into the available bits of the codec according to the primary transfer function. The focus range, cropping, and mapping (e.g., quantization) parameters may be signaled to a decoder, for example as metadata in the output encoded stream, so that an inverse adaptive transfer function method may be performed at the decoder to generate full-range video data for a device such as an HDR-enabled display.

However, in some embodiments, a different transfer function (referred to as an internal or secondary transfer function) than the primary transfer function may be used to represent the video data within the codec. In these embodiments, the input video data may be cropped to the determined focus range for a scene, sequence, frame, or region, and then mapped, scaled or quantized into the available bits of the codec according to the secondary transfer function. The secondary transfer function may, for example, allow the video signal to be represented with higher precision within the codec than could be done using the primary transfer function. In these embodiments, in addition to the focus range, cropping and mapping (e.g., quantization) parameters, information on how to convert the video data from the secondary transfer function to the primary transfer function may also be signaled to the decoder, for example as metadata in the output stream. This information may include, but is not limited to, the type of the secondary transfer function (e.g., power law gamma, log, PQ, etc.) and one or more control parameters for the transfer function. In some embodiments, information describing the primary transfer function may also be signaled.

In some embodiments of an adaptive transfer function method, the internal or secondary transfer function used inside the codec may be a discontinuous transfer function representation in which one or more portions of the original or primary transfer function may be retained for the internal representation, with a different transfer function used for the remainder of the internal representation. In these embodiments, the region(s) of the primary transfer function that are retained may be precisely described and signaled in the output stream, for example using a table representation. Information about the different transfer function may also be signaled.

As illustrated in FIGS. 7A through 7C, embodiments of the adaptive transfer function method may be performed at the frame level or at the region level within a frame. Thus neighbor or nearby encoded and decoded video frames, or regions within a frame, may have significantly different transfer function representations, which may, for example, negatively impact encoding (e.g., motion estimation, motion compensation, and reconstruction) since the transfer function representation of a current frame or region being encoded may be significantly different than the transfer function representation of neighboring frames or regions that may be used in the encoding process. However, in some embodiments, weighted prediction that may be provided in codecs using coding formats such as advanced video coding (AVC) and high efficiency video coding (HEVC) formats may be leveraged to improve encoding substantially. In these embodiments, weighting parameters may be provided for frames or regions that can be used in the weighted prediction process to adjust for differences in transfer function representations. The weighting parameters may be signaled, for example by including the parameters in frame or block metadata. For example, in AVC or HEVC encoder, the weighting parameters may be signaled in slice header metadata, and may be selected by altering the reference index within a macroblock in AVC or prediction unit (PU) in HEVC. In some embodiments, the weighting information may be explicitly signaled per block, with partial or no reliance on the slice header. For example, in some embodiments, primary or master weights may be signaled in the slice header, with deltas or differences that may be used to adjust the primary weights signaled at the block level. In some embodiments, weighting parameters may also include color-weighting information. In some embodiments, these weighting parameters may be used in intra-frame prediction as well as inter-frame prediction. For example, in intra-frame prediction, instead of or in addition to using previously processed neighbor or nearby data (e.g., pixels or blocks of pixels) as is, additional weighting and offset parameters may be provided that may be used to adjust the predictors according to the possibly different transfer function characteristics of the neighbor or nearby samples.

In some embodiments where an internal or secondary transfer function is used to represent data within the codec, in addition to the weighting parameters, information on the secondary transfer function may also be signaled in the codec for use in transfer function prediction. In some embodiments, for example, the secondary transfer function information may be signaled in the slice header using a transfer function table that associates every reference data index with one or more transfer function adjustment parameters. In some embodiments, the secondary transfer function information may instead or also be signaled at the block level. In embodiments that use a discontinuous transfer function representation, multiple weighting parameters (e.g., parameters that impact different brightness values or levels differently) may be signaled in the slice header and/or at the block level.

In some embodiments where an internal or secondary transfer function is used and adjusted to represent data within the codec, the internal transfer function and adjustments used for a scene, sequence, frame, or region may be dynamically determined. In some embodiments, the internal transfer function may be determined based on one or more characteristics of a current video frame or region(s) of a frame. The characteristics may include, but are not limited to, lowest and peak brightness, motion, texture, color, histogram mode, percentage concentration, etc. In some embodiments determining the internal transfer function for a current frame may also utilize temporally past and/or future frames as reference frames. In some embodiments, for example, a determination of the internal transfer function may utilize a window of one, two or more reference frames that appear before and/or after the current frame in the video or video sequence. Using window-based information in determining the internal transfer function may account for changes in the characteristics of each frame, and may help to avoid or smooth over significant jumps or discontinuities in the internal transfer function adjustments that otherwise may negatively impact encoding. A smooth, window-based adaptive transfer function method may provide better transfer function selection for purposes of encoding and for the final signal reconstruction at the full/desired transfer function range. In some embodiments, the window-based adaptive transfer function method may include evaluating the peak and lowest brightness of the frames within a window to determine an internal transfer function. In some embodiments, the brightness histogram, the mode of the histogram, the concentration of values and how these adjust, and segmentation of areas or regions within a window may be evaluated in the window-based method for determination of internal transfer functions. In some embodiments, information about the human visual system may be utilized in this selection to achieve improved performance.

In some embodiments, the decision windows used in a window-based adaptive transfer function method may be non-overlapping, with decisions for each frame or region made separately. In some embodiments, there may be an overlap at the window boundaries, with boundary frames outside the current window considered in the evaluation but not adjusted themselves. In some embodiments, boundary frames may be affected by multiple windows through an adaptation process, for example a weighted averaging of the information for the internal transfer function based on window distance, which may help to so ensure smooth transitioning between adjacent windows. In some embodiments, the window-based decision process for an internal transfer function may be based on a "running window" approach in which each frame's internal transfer function is determined based on the fame's own characteristics and characteristics of one or more temporally past and/or future frames and/or windows. In some embodiments, the internal transfer functions of the past and/or future frames and/or windows may also be leveraged in determining the internal transfer function for a current frame. In some embodiments, a multi-pass approach may be implemented in which the behavior and performance of an internal transfer function that was pre-selected in a previous pass is considered to tune a subsequent internal transfer function to achieve better encoding efficiency and better rendering given a final transfer function target.

In some embodiments, determination of and adjustments to the internal transfer function (e.g., range, type, bit depth, etc.) may be based on characteristics of the video data being encoded. In some embodiments, compression capabilities or characteristics of particular transfer functions for the signal in question may also considered in selecting and/or adjusting an internal transfer function. In some embodiments, determination of and adjustments to the internal transfer function may instead or in addition be based on one or more target displays and their characteristics or limitations. For example, if it is known that a display is being targeted that has a limited dynamic range compared to the dynamic range supported by the primary transfer function, then there may be no point in including values that are out-of-range (to the target display in the encoded, compressed signal. Instead, an internal transfer function representation that provides a best fit of the signal to the display's dynamic range may be determined, which may allow for a better compressed representation of the signal for that particular display's capabilities. In some embodiments, if multiple displays are to be supported by a codec, then a dynamic range may be selected for the displays, and an internal transfer function representation that provides a best fit to the selected dynamic range may be determined. For example, the display with the best capabilities (e.g. with the highest dynamic range) may be selected, and its dynamic range may be used in adjusting the internal transfer function to generate video output for all of the displays. As another example, the dynamic range selection may be based on a pricing model in which one or more characteristics (e.g., the dynamic range) of the displays may be weighed (e.g., based on a determined or indicated ranking of the displays in terms of importance or other factors), and the internal transfer function may be adjusted accordingly.

Embodiments of the adaptive transfer function methods for video encoding and decoding systems or codecs as described herein may provide the ability of signaling (from the encoder) and supporting (from the encoder and decoder) an extended or high dynamic range while keeping complexity of the codec (e.g. bit depth) within reasonable bounds. This may be achieved by dynamically determining focus ranges at the region, frame, scene, or sequence level, cropping the input data to the focus range, and mapping the cropped data from the bit depth of the input video into the bit depth of the codec, while signaling the appropriate parameters (e.g., focus range, quantization parameters, etc.) from the encoder to the decoder at the region, frame, scene, or sequence level so that the dynamic range can be extended to a full range of an HDR-enabled display. In addition, in some embodiments, appropriate parameters (e.g., weights, etc.) for performing weighted prediction may be signaled when different frames are encoded using different transfer function representations.

Example Devices and Apparatus

FIGS. 10 through 14 show non-limiting examples of devices and apparatus in or with which embodiments or components of the various digital video or image processing and display methods and apparatus as described herein may be implemented. FIG. 10 illustrates an example SOC, and FIG. 11 illustrates an example device implementing an SOC. FIG. 12 illustrates an example computer system that may implement the methods and apparatus described herein. FIGS. 13 and 14 illustrate example multifunction devices that may implement the methods and apparatus described herein.

Example System on a Chip (SOC)

Turning now to FIG. 10, a block diagram of one embodiment of a system-on-a-chip (SOC) 8000 that may be used in embodiments. SOC 8000 is shown coupled to a memory 8800. As implied by the name, the components of the SOC 8000 may be integrated onto a single semiconductor substrate as an integrated circuit "chip." In some embodiments, the components may be implemented on two or more discrete chips in a system. However, the SOC 8000 will be used as an example herein. In the illustrated embodiment, the components of the SOC 8000 include a central processing unit (CPU) complex 8020, on-chip peripheral components 8040A-8040C (more briefly, "peripherals"), a memory controller (MC) 8030, and a communication fabric 8010. The components 8020, 8030, 8040A-8040C, may all be coupled to the communication fabric 8010. The memory controller 8030 may be coupled to the memory 8800 during use, and the peripheral 8040B may be coupled to an external interface 8900 during use. In the illustrated embodiment, the CPU complex 8020 includes one or more processors (P) 8024 and a level two (L2) cache 8022.

The peripherals 8040A-8040B may be any set of additional hardware functionality included in the SOC 8000. For example, the peripherals 8040A-8040B may include video peripherals such as an image signal processor configured to process image capture data from a camera or other image sensor, display controllers configured to display video data on one or more display devices, graphics processing units (GPUs), video encoder/decoders or codecs, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 8900 external to the SOC 8000 (e.g. the peripheral 8040B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The CPU complex 8020 may include one or more CPU processors 8024 that serve as the CPU of the SOC 8000. The CPU of the system includes the processor(s) that execute the main control software of the system, such as an operating system. Generally, software executed by the CPU during use may control the other components of the system to realize the desired functionality of the system. The processors 8024 may also execute other software, such as application programs. The application programs may provide user functionality, and may rely on the operating system for lower level device control. Accordingly, the processors 8024 may also be referred to as application processors. The CPU complex 8020 may further include other hardware such as the L2 cache 8022 and/or and interface to the other components of the system (e.g. an interface to the communication fabric 8010). Generally, a processor may include any circuitry and/or microcode configured to execute instructions defined in an instruction set architecture implemented by the processor. The instructions and data operated on by the processors in response to executing the instructions may generally be stored in the memory 8800, although certain instructions may be defined for direct processor access to peripherals as well. Processors may encompass processor cores implemented on an integrated circuit with other components as a system on a chip (SOC 8000) or other levels of integration. Processors may further encompass discrete microprocessors, processor cores and/or microprocessors integrated into multichip module implementations, processors implemented as multiple integrated circuits, etc.

The memory controller 8030 may generally include the circuitry for receiving memory operations from the other components of the SOC 8000 and for accessing the memory 8800 to complete the memory operations. The memory controller 8030 may be configured to access any type of memory 8800. For example, the memory 8800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 8030 may include queues for memory operations, for ordering (and potentially reordering) the operations and presenting the operations to the memory 8800. The memory controller 8030 may further include data buffers to store write data awaiting write to memory and read data awaiting return to the source of the memory operation. In some embodiments, the memory controller 8030 may include a memory cache to store recently accessed memory data. In SOC implementations, for example, the memory cache may reduce power consumption in the SOC by avoiding re-access of data from the memory 8800 if it is expected to be accessed again soon. In some cases, the memory cache may also be referred to as a system cache, as opposed to private caches such as the L2 cache 8022 or caches in the processors 8024, which serve only certain components. Additionally, in some embodiments, a system cache need not be located within the memory controller 8030.

In an embodiment, the memory 8800 may be packaged with the SOC 8000 in a chip-on-chip or package-on-package configuration. A multichip module configuration of the SOC 8000 and the memory 8800 may be used as well. Such configurations may be relatively more secure (in terms of data observability) than transmissions to other components in the system (e.g. to the end points 16A-16B). Accordingly, protected data may reside in the memory 8800 unencrypted, whereas the protected data may be encrypted for exchange between the SOC 8000 and external endpoints.

The communication fabric 8010 may be any communication interconnect and protocol for communicating among the components of the SOC 8000. The communication fabric 8010 may be bus-based, including shared bus configurations, cross bar configurations, and hierarchical buses with bridges. The communication fabric 8010 may also be packet-based, and may be hierarchical with bridges, cross bar, point-to-point, or other interconnects.

It is noted that the number of components of the SOC 8000 (and the number of subcomponents for those shown in FIG. 10, such as within the CPU complex 8020) may vary from embodiment to embodiment. There may be more or fewer of each component/subcomponent than the number shown in FIG. 10.

FIG. 11 a block diagram of one embodiment of a system 9000 that includes at least one instance of an SOC 8000 coupled to one or more external peripherals 9020 and the external memory 8800. A power management unit (PMU) 9010 is provided which supplies the supply voltages to the SOC 8000 as well as one or more supply voltages to the memory 8800 and/or the peripherals 9020. In some embodiments, more than one instance of the SOC 8000 may be included (and more than one memory 8800 may be included as well).

The peripherals 9020 may include any desired circuitry, depending on the type of system 9000. For example, in one embodiment, the system 9000 may be a mobile device (e.g. personal digital assistant (PDA), smart phone, etc.) and the peripherals 9020 may include devices for various types of wireless communication, such as wifi, Bluetooth, cellular, global positioning system, etc. The peripherals 9020 may also include additional storage, including RAM storage, solid state storage, or disk storage. The peripherals 9020 may include user interface devices such as a display screen, including touch display screens or multitouch display screens, keyboard or other input devices, microphones, speakers, etc. In other embodiments, the system 9000 may be any type of computing system (e.g. desktop personal computer, laptop, workstation, net top etc.).

The external memory 8800 may include any type of memory. For example, the external memory 8800 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 8800 may include one or more memory modules to which the memory devices are mounted, such as single inline memory modules (SIMMs), dual inline memory modules (DIMMs), etc. Alternatively, the external memory 8800 may include one or more memory devices that are mounted on the SOC 8000 in a chip-on-chip or package-on-package implementation.

Multifunction Device Examples

FIG. 13 illustrates a block diagram of a portable multifunction device in accordance with some embodiments. In some embodiments, the device is a portable communications device, such as a mobile telephone, that also contains other functions, such as PDA, camera, video capture and/or playback, and/or music player functions. Example embodiments of portable multifunction devices include, without limitation, the iPhone®, iPod Touch®, and iPad® devices from Apple Inc. of Cupertino, Calif. Other portable electronic devices, such as laptops, cell phones, smartphones, pad or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera and/or video camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Device 2100 may include memory 2102 (which may include one or more computer readable storage mediums), memory controller 2122, one or more processing units (CPU's) 2120, peripherals interface 2118, RF circuitry 2108, audio circuitry 2110, speaker 2111, touch-sensitive display system 2112, microphone 2113, input/output (I/O) subsystem 2106, other input control devices 2116, and external port 2124. Device 2100 may include one or more optical sensors or cameras 2164. These components may communicate over one or more communication buses or signal lines 2103.

It should be appreciated that device 2100 is only one example of a portable multifunction device, and that device 2100 may have more or fewer components than shown, may combine two or more components, or may have a different configuration or arrangement of the components. The various components shown in FIG. 13 may be implemented in hardware, software, or a combination of hardware and software, including one or more signal processing and/or application specific integrated circuits.

Memory 2102 may include high-speed random access memory and may also include non-volatile memory, such as one or more magnetic disk storage devices, flash memory devices, or other non-volatile solid-state memory devices. Access to memory 2102 by other components of device 2100, such as CPU 2120 and the peripherals interface 2118, may be controlled by memory controller 2122.

Peripherals interface 2118 can be used to couple input and output peripherals of the device to CPU 2120 and memory 2102. The one or more processors 2120 run or execute various software programs and/or sets of instructions stored in memory 2102 to perform various functions for device 2100 and to process data.

In some embodiments, peripherals interface 2118, CPU 2120, and memory controller 2122 may be implemented on a single chip, such as chip 2104. In some other embodiments, they may be implemented on separate chips.

RF (radio frequency) circuitry 2108 receives and sends RF signals, also called electromagnetic signals. RF circuitry 2108 converts electrical signals to/from electromagnetic signals and communicates with communications networks and other communications devices via the electromagnetic signals. RF circuitry 2108 may include well-known circuitry for performing these functions, including but not limited to an antenna system, an RF transceiver, one or more amplifiers, a tuner, one or more oscillators, a digital signal processor, a coder/decoder (codec) chipset, a subscriber identity module (SIM) card, memory, and so forth. RF circuitry 2108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 2110, speaker 2111, and microphone 2113 provide an audio interface between a user and device 2100. Audio circuitry 2110 receives audio data from peripherals interface 2118, converts the audio data to an electrical signal, and transmits the electrical signal to speaker 2111. Speaker 2111 converts the electrical signal to human-audible sound waves. Audio circuitry 2110 also receives electrical signals converted by microphone 2113 from sound waves. Audio circuitry 2110 converts the electrical signal to audio data and transmits the audio data to peripherals interface 2118 for processing. Audio data may be retrieved from and/or transmitted to memory 2102 and/or RF circuitry 2108 by peripherals interface 2118. In some embodiments, audio circuitry 2110 also includes a headset jack. The headset jack provides an interface between audio circuitry 2110 and removable audio input/output peripherals, such as output-only headphones or a headset with both output (e.g., a headphone for one or both ears) and input (e.g., a microphone).

I/O subsystem 2106 couples input/output peripherals on device 2100, such as touch screen 2112 and other input control devices 2116, to peripherals interface 2118. I/O subsystem 2106 may include display controller 2156 and one or more input controllers 2160 for other input control devices 2116. The one or more input controllers 2160 receive/send electrical signals from/to other input control devices 2116. The other input control devices 2116 may include physical buttons (e.g., push buttons, rocker buttons, etc.), dials, slider switches, joysticks, click wheels, and so forth. In some alternate embodiments, input controller(s) 2160 may be coupled to any (or none) of the following: a keyboard, infrared port, USB port, and a pointer device such as a mouse. The one or more buttons may include an up/down button for volume control of speaker 2111 and/or microphone 2113. The one or more buttons may include a push button.

Touch-sensitive display 2112 provides an input interface and an output interface between the device and a user. Display controller 2156 receives and/or sends electrical signals from/to touch screen 2112. Touch screen 2112 displays visual output to the user. The visual output may include graphics, text, icons, video, and any combination thereof (collectively termed "graphics"). In some embodiments, some or all of the visual output may correspond to user-interface objects.

Touch screen 2112 has a touch-sensitive surface, sensor or set of sensors that accepts input from the user based on haptic and/or tactile contact. Touch screen 2112 and display controller 2156 (along with any associated modules and/or sets of instructions in memory 2102) detect contact (and any movement or breaking of the contact) on touch screen 2112 and converts the detected contact into interaction with user-interface objects (e.g., one or more soft keys, icons, web pages or images) that are displayed on touch screen 2112. In an example embodiment, a point of contact between touch screen 2112 and the user corresponds to a finger of the user.

Touch screen 2112 may use LCD (liquid crystal display) technology, LPD (light emitting polymer display) technology, or LED (light emitting diode) technology, although other display technologies may be used in other embodiments. Touch screen 2112 and display controller 2156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 2112. In an example embodiment, projected mutual capacitance sensing technology is used, such as that found in the iPhone®, iPod Touch®, and iPad® from Apple Inc. of Cupertino, Calif.

Touch screen 2112 may have a video resolution in excess of 100 dpi. In some embodiments, the touch screen has a video resolution of approximately 160 dpi. The user may make contact with touch screen 2112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 2112, device 2100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 2112 or an extension of the touch-sensitive surface formed by the touch screen.

Device 2100 also includes power system 2162 for powering the various components. Power system 2162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 2100 may also include one or more optical sensors or cameras 2164. FIG. 13 shows an optical sensor coupled to optical sensor controller 2158 in I/O subsystem 2106. Optical sensor 2164 may, for example, include charge-coupled device (CCD) or complementary metal-oxide semiconductor (CMOS) phototransistors or photosensors. Optical sensor 2164 receives light from the environment, projected through one or more lenses, and converts the light to data representing an image. In conjunction with imaging module 2143 (also called a camera module), optical sensor 2164 may capture still images and/or video sequences. In some embodiments, at least one optical sensor may be located on the back of device 2100, opposite touch screen display 2112 on the front of the device. In some embodiments, the touch screen display may be used as a viewfinder for still and/or video image acquisition. In some embodiments, at least one optical sensor may instead or also be located on the front of the device.

Device 2100 may also include one or more proximity sensors 2166. FIG. 13 shows proximity sensor 2166 coupled to peripherals interface 2118. Alternately, proximity sensor 2166 may be coupled to input controller 2160 in I/O subsystem 2106. In some embodiments, the proximity sensor turns off and disables touch screen 2112 when the multifunction device is placed near the user's ear (e.g., when the user is making a phone call).

Device 2100 may also include one or more orientation sensors 2168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 2100. In some embodiments, the one or more orientation sensors include any combination of orientation/rotation sensors. FIG. 13 shows the one or more orientation sensors 2168 coupled to peripherals interface 2118. Alternately, the one or more orientation sensors 2168 may be coupled to an input controller 2160 in I/O subsystem 2106. In some embodiments, information is displayed on the touch screen display in a portrait view or a landscape view based on an analysis of data received from the one or more orientation sensors.

In some embodiments, device 2100 may also include one or more other sensors (not shown) including but not limited to ambient light sensors and motion detectors. These sensors may be coupled to peripherals interface 2118 or, alternately, may be coupled to an input controller 2160 in I/O subsystem 2106. For example, in some embodiments, device 2100 may include at least one forward-facing (away from the user) and at least one backward-facing (towards the user) light sensors that may be used to collect ambient lighting metrics from the environment of the device 2100 for use in video and image capture, processing, and display applications.

In some embodiments, the software components stored in memory 2102 include operating system 2126, communication module 2128, contact/motion module (or set of instructions) 2130, graphics module 2132, text input module 2134, Global Positioning System (GPS) module 2135, and applications 2136. Furthermore, in some embodiments memory 2102 stores device/global internal state 2157. Device/global internal state 2157 includes one or more of: active application state, indicating which applications, if any, are currently active; display state, indicating what applications, views or other information occupy various regions of touch screen display 2112; sensor state, including information obtained from the device's various sensors and input control devices 2116; and location information concerning the device's location and/or attitude.

Operating system 2126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 2128 facilitates communication with other devices over one or more external ports 2124 and also includes various software components for handling data received by RF circuitry 2108 and/or external port 2124. External port 2124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 2130 may detect contact with touch screen 2112 (in conjunction with display controller 2156) and other touch sensitive devices (e.g., a touchpad or physical click wheel). Contact/motion module 2130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 2130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 2130 and display controller 2156 detect contact on a touchpad.

Contact/motion module 2130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 2132 includes various software components for rendering and displaying graphics on touch screen 2112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 2132 stores data representing graphics to be used. Each graphic may be assigned a corresponding code. Graphics module 2132 receives, from applications etc., one or more codes specifying graphics to be displayed along with, if necessary, coordinate data and other graphic property data, and then generates screen image data to output to display controller 2156.

Text input module 2134, which may be a component of graphics module 2132, provides soft keyboards for entering text in various applications that need text input.

GPS module 2135 determines the location of the device and provides this information for use in various applications (e.g., to telephone module 2138 for use in location-based dialing, to camera module 2143 as picture/video metadata, and to applications that provide location-based services such as map/navigation applications).

Applications 2136 may include one or more of, but are not limited to, the following modules (or sets of instructions), or a subset or superset thereof:

telephone module 2138;
video conferencing module 2139;
camera module 2143 for still and/or video imaging;
image management module 2144;
browser module 2147;
search module 2151;
video and music player module 2152, which may be made up of a video player module and a music player module; and/or
online video module 2155.

Examples of other applications 2136 that may be stored in memory 2102 include but are not limited to other word processing applications, other image editing applications, drawing applications, presentation applications, communication/social media applications, map applications, JAVA-enabled applications, encryption, digital rights management, voice recognition, and voice replication.

In conjunction with RF circuitry 2108, audio circuitry 2110, speaker 2111, microphone 2113, touch screen 2112, display controller 2156, contact module 2130, graphics module 2132, and text input module 2134, telephone module 2138 may be used to enter a sequence of characters corresponding to a telephone number, access one or more telephone numbers in an address book, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 2108, audio circuitry 2110, speaker 2111, microphone 2113, touch screen 2112, display controller 2156, optical sensor 2164, optical sensor controller 2158, contact/motion module 2130, graphics module 2132, text input module 2134, and telephone module 2138, videoconferencing module 2139 includes executable instructions to initiate, conduct, and terminate a video conference between a user and one or more other participants in accordance with user instructions.

In conjunction with touch screen 2112, display controller 2156, optical sensor(s) 2164, optical sensor controller 2158, contact/motion module 2130, graphics module 2132, and image management module 2144, camera module 2143 includes executable instructions to capture still images or video (including a video stream) and store them into memory 2102, modify characteristics of a still image or video, or delete a still image or video from memory 2102.

In conjunction with touch screen 2112, display controller 2156, contact/motion module 2130, graphics module 2132, text input module 2134, and camera module 2143, image management module 2144 includes executable instructions to arrange, modify (e.g., edit), or otherwise manipulate, label, delete, present (e.g., in a digital slide show or album), and store still and/or video images.

In conjunction with RF circuitry 2108, touch screen 2112, display system controller 2156, contact/motion module 2130, graphics module 2132, and text input module 2134, browser module 2147 includes executable instructions to browse the Internet in accordance with user instructions, including searching, linking to, receiving, and displaying web pages or portions thereof, as well as attachments and other files linked to web pages.

In conjunction with touch screen 2112, display system controller 2156, contact/motion module 2130, graphics module 2132, and text input module 2134, search module 2151 includes executable instructions to search for text, music, sound, image, video, and/or other files in memory 2102 that match one or more search criteria (e.g., one or more user-specified search terms) in accordance with user instructions.

In conjunction with touch screen 2112, display system controller 2156, contact/motion module 2130, graphics module 2132, audio circuitry 2110, speaker 2111, RF circuitry 2108, and browser module 2147, video and music player module 2152 includes executable instructions that allow the user to download and play back recorded music and other sound files stored in one or more file formats, such as MP3 or AAC files, and executable instructions to display, present or otherwise play back videos (e.g., on touch screen 2112 or on an external, connected display via external port 2124). In some embodiments, device 2100 may include the functionality of an MP3 player, such as an iPod (trademark of Apple Inc.).

In conjunction with touch screen 2112, display system controller 2156, contact/motion module 2130, graphics module 2132, audio circuitry 2110, speaker 2111, RF circuitry 2108, text input module 2134, and browser module 2147, online video module 2155 includes instructions that allow the user to access, browse, receive (e.g., by streaming and/or download), play back (e.g., on the touch screen or on an external, connected display via external port 2124), and otherwise manage online videos in one or more video formats, such as the H.264/AVC format or the H.265/HEVC format.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 2102 may store a subset of the modules and data structures identified above. Furthermore, memory 2102 may store additional modules and data structures not described above.

In some embodiments, device 2100 is a device where operation of a predefined set of functions on the device is performed exclusively through a touch screen and/or a touchpad. By using a touch screen and/or a touchpad as the primary input control device for operation of device 2100, the number of physical input control devices (such as push buttons, dials, and the like) on device 2100 may be reduced.

The predefined set of functions that may be performed exclusively through a touch screen and/or a touchpad include navigation between user interfaces. In some embodiments, the touchpad, when touched by the user, navigates device 2100 to a main, home, or root menu from any user interface that may be displayed on device 2100. In such embodiments, the touchpad may be referred to as a "menu button." In some other embodiments, the menu button may be a physical push button or other physical input control device instead of a touchpad.

FIG. 14 illustrates a portable multifunction device 2100 having a touch screen 2112 in accordance with some embodiments. The touch screen may display one or more graphics within user interface (UI) 2200. In at least some embodiments of a device 2100, a user may select one or more of the graphics by making a gesture on the graphics, for example, with one or more fingers 2202 (not drawn necessarily drawn to scale in the figure) or one or more styluses 2203 (not necessarily drawn to scale in the figure).

Device 2100 may also include one or more physical buttons, such as a "home" or menu button 2204. As described previously, menu button 2204 may be used to navigate to any application 2136 in a set of applications that may be executed on device 2100. Alternatively, in some embodiments, the menu button is may be implemented as a soft key in a GUI displayed on touch screen 2112.

In one some embodiments, device 2100 includes touch screen 2112, home or menu button 2204, push button 2206 for powering the device on/off and locking the device, volume adjustment button(s) 2208, Subscriber Identity Module (SIM) card slot 2210, head set jack 2212, and docking/charging external port 2124. Push button 2206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 2100 also may accept verbal input for activation or deactivation of some functions through microphone 2113.

Device 2100 may also include one or more cameras 2164. A camera 2164 may, for example, include charge-coupled device (CCD) or complementary metal-oxide semiconductor (CMOS) phototransistors or photosensors. A camera 2164 receives light from the environment, projected through one or more lenses, and converts the light to data representing an image or video frame. In some embodiments, at least one camera 2164 may be located on the back of device 2100, opposite touch screen display 2112 on the front of the device. In some embodiments, at least one camera 2164 may instead or also located on the front of the device with the touch screen display 2112, for example so that the user's image may be obtained for videoconferencing while the user views the other video conference participants on the touch screen display 2112. In some embodiments, at least one camera 2164 may be located on the front of the device 2100, and at least one camera 2164 may be located on the back of the device 2100. In some embodiments, the touch screen display 2112 may be used as a viewfinder and/or user interface for still image and/or video sequence acquisition applications.

Device 2100 may include video and image processing hardware and/or software, including but not limited to video encoding and/or decoding components, codecs, modules, or pipelines, that may be used to capture, process, convert, compress, decompress, store, modify, transmit, display, and otherwise manage and manipulate still images and/or video frames or video sequences captured via camera 2164 or otherwise acquired (e.g., via a network interface). In some embodiments, device 2100 may also include one or more light or other sensors that may be used to collect ambient lighting or other metrics from the environment of the device 2100 for use in video and image capture, processing, and display.

Example Computer System

FIG. 12 illustrates an example computer system 2900 that may be configured to execute any or all of the embodiments described above. In different embodiments, computer system 2900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, application server, storage device, a video recording device, a peripheral device such as a switch, modem, router, or in general any type of computing or electronic device.

Various embodiments as described herein, may be executed in one or more computer systems 2900, which may interact with various other devices. Note that any component, action, or functionality described above with respect to FIGS. 1-11 may be implemented on one or more computers configured as computer system 2900 of FIG. 12, according to various embodiments. In the illustrated embodiment, computer system 2900 includes one or more processors 2910 coupled to a system memory 2920 via an input/output (I/O) interface 2930. Computer system 2900 further includes a network interface 2940 coupled to I/O interface 2930, and one or more input/output devices or components 2950, such as cursor control 2960, keyboard 2970, display(s) 2980, camera(s) 2990, and sensor(s) 2992 including but not limited to light sensors and motion detectors. In some cases, it is contemplated that embodiments may be implemented using a single instance of computer system 2900, while in other embodiments multiple such systems, or multiple nodes making up computer system 2900, may be configured to host different portions or instances of embodiments. For example, in one embodiment some elements may be implemented via one or more nodes of computer system 2900 that are distinct from those nodes implementing other elements.

In various embodiments, computer system 2900 may be a uniprocessor system including one processor 2910, or a multiprocessor system including several processors 2910 (e.g., two, four, eight, or another suitable number). Processors 2910 may be any suitable processor capable of executing instructions. For example, in various embodiments processors 2910 may be general-purpose or embedded processors implementing any of a variety of instruction set architectures (ISAs), such as the x829, PowerPC, SPARC, or MIPS ISAs, or any other suitable ISA. In multiprocessor systems, each of processors 2910 may commonly, but not necessarily, implement the same ISA.

System memory 2920 may be configured to store program instructions 2922 and/or data accessible by processor 2910. In various embodiments, system memory 2920 may be implemented using any suitable memory technology, such as static random access memory (SRAM), synchronous dynamic RAM (SDRAM), nonvolatile/Flash-type memory, or any other type of memory. In the illustrated embodiment, program instructions 2922 may be configured to implement any of the functionality described herein. Additionally, memory 2920 may include any of the information or data structures described herein. In some embodiments, program instructions and/or data may be received, sent or stored upon different types of computer-accessible media or on similar media separate from system memory 2920 or computer system 2900. While computer system 2900 is described as implementing the functionality of functional blocks of previous Figures, any of the functionality described herein may be implemented via such a computer system.

In one embodiment, I/O interface 2930 may be configured to coordinate I/O traffic between processor 2910, system memory 2920, and any peripheral devices in the device, including network interface 2940 or other peripheral interfaces, such as input/output devices 2950. In some embodiments, I/O interface 2930 may perform any necessary protocol, timing or other data transformations to convert data signals from one component (e.g., system memory 2920) into a format suitable for use by another component (e.g., processor 2910). In some embodiments, I/O interface 2930 may include support for devices attached through various types of peripheral buses, such as a variant of the Peripheral Component Interconnect (PCI) bus standard or the Universal Serial Bus (USB) standard, for example. In some embodiments, the function of I/O interface 2930 may be split into two or more separate components, such as a north bridge and a south bridge, for example. Also, in some embodiments some or all of the functionality of I/O interface 2930, such as an interface to system memory 2920, may be incorporated directly into processor 2910.

Network interface 2940 may be configured to allow data to be exchanged between computer system 2900 and other devices attached to a network 2985 (e.g., carrier or agent devices) or between nodes of computer system 2900. Network 2985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2950 may, in some embodiments, include one or more display terminals, keyboards, keypads, touchpads, scanning devices, voice or optical recognition devices, or any other devices suitable for entering or accessing data by one or more computer systems 2900. Multiple input/output devices 2950 may be present in computer system 2900 or may be distributed on various nodes of computer system 2900. In some embodiments, similar input/output devices may be separate from computer system 2900 and may interact with one or more nodes of computer system 2900 through a wired or wireless connection, such as over network interface 2940.

As shown in FIG. 12, memory 2920 may include program instructions 2922, which may be processor-executable to implement any element or action described above. In one embodiment, the program instructions may implement the methods described above. In other embodiments, different elements and data may be included. Note that data may include any data or information described above.

Those skilled in the art will appreciate that computer system 2900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2900 may be transmitted to computer system 2900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:
1. A system comprising:
  at least one processor;

wherein the at least one processor implements an encoder module configured to process video data according to an encoding format to generate encoded video data, wherein the encoded video data is represented using code values of an internal transfer function at a bit depth of C bits within the encoder module; and wherein the at least one processor implements an adaptive transfer function module configured to:

receive input video data using code values of a transfer function at a bit depth of N bits, wherein N is greater than C;

determine a focus dynamic range for the input video data based at least in part according to one or more characteristics of the input video data, wherein the focus dynamic range is less than a total dynamic range of the input video data such that one or more code values of the input video data are outside the focus dynamic range, and wherein the focus dynamic range is representable by the code values of the internal transfer function at the bit depth of C bits;

crop the input video data to the focus dynamic range to generate cropped N-bit video data such that the cropped N-bit video data excludes the one or more code values of the input video data outside the focus dynamic range;

map the cropped N-bit video data according to the internal transfer function of the encoder module to generate C-bit video data; and output the C-bit video data to the encoder module for processing.

2. The system as recited in claim 1, wherein the adaptive transfer function module is configured to perform said receive, said determine, said crop, said map, and said output for each of one or more video frames or for each of one or more sequences of two or more video frames.

3. The system as recited in claim 1, wherein the adaptive transfer function module is configured to perform said receive, said determine, said crop, said map, and said output for two or more regions within each of one or more video frames.

4. The system as recited in claim 1, wherein the encoder module is further configured to include format metadata in the encoded video data, the format metadata indicating one or more parameters used in said crop.

5. The system as recited in claim 4, further comprising:

a decoder module configured to process the encoded video data generated by the encoder module to generate decoded C-bit video data and extracted format metadata; and an inverse adaptive transfer function module configured to expand the decoded C-bit video data according to the extracted format metadata to generate D-bit video data covering full dynamic range of a target device.

6. The system as recited in claim 5, wherein the target device is a high dynamic range (HDR) enabled device.

7. The system as recited in claim 1, wherein the internal transfer function is the same as the transfer function used to represent the input video data.

8. The system as recited in claim 1, wherein the internal transfer function is different than the transfer function used to represent the input video data.

9. The system as recited in claim 1, wherein the internal transfer function is a discontinuous transfer function representation that includes one or more portions of the transfer function used to represent the input video data and that uses a different transfer function for the remainder of the transfer function representation.

10. The system as recited in claim 1, wherein, to determine the focus dynamic range for the input video data, the adaptive transfer function module is configured to determine the focus dynamic range for the input video data at least in part according to one or more characteristics of reference video data from one or more video frames that were previously processed by the encoder module or from one or more previously processed portions of a current video frame being processed by the encoder module.

11. The system as recited in claim 1, wherein the one or more characteristics used to determine the focus dynamic range for the input video data include one or more of brightness, motion, texture, or color characteristics of the input video data.

12. The system as recited in claim 1, wherein the focus dynamic range represents an effective dynamic range of the human visual system for a current scene, sequence, frame, or region of a frame.

13. The system as recited in claim 1, wherein, to process a current video frame according to an encoding format to generate encoded video data, the encoder module is configured to access reference data from one or more previously processed video frames, wherein the system further comprises a reformatting module configured to convert the reference data from the focus dynamic range used in processing the respective video frames to the focus dynamic range determined for the current frame.

14. The system as recited in claim 1, wherein the encoding format is one of H.264/Advanced Video Coding (AVC) format or H.265 High Efficiency Video Coding (HEVC) format.

15. A method, comprising:

iteratively performing, by an encoder module:

determining a focus dynamic range for input video data according to one or more characteristics of the input video data, wherein the input video data is represented using code values of a transfer function at a bit depth of N bits, and wherein the focus dynamic range is less than a total dynamic range of the input video data such that one or more code values of the input video data are outside the focus dynamic range, and wherein the focus dynamic range is representable by code values of a transfer function of the encoder module at a bit depth of C bits;

cropping the input video data to the focus dynamic range to generate cropped N-bit video data such that the cropped N-bit video data excludes the one or more code values of the input video data outside the focus dynamic range;

mapping the code values of the cropped N-bit video data to the code values of the transfer function of the encoder module at the bit depth of C bits to generate C-bit video data, wherein N is greater than C; and processing the C-bit video data according to an encoding format to generate encoded video data as output.

16. The method as recited in claim 15, further comprising:

iteratively performing, by a decoder module:

decoding input encoded video data to generate decoded C-bit video data; and expanding the decoded C-bit video data according to format metadata to generate D-bit video data covering full dynamic range of a high dynamic range (HDR)-enabled device, wherein the format metadata indicates one or more parameters used in said cropping and said mapping.

17. The method as recited in claim 15, wherein the focus dynamic range represents an effective dynamic range of the human visual system for a current scene, sequence, frame, or region of a frame.

18. An apparatus, comprising:
an encoder module configured to:
determine a focus dynamic range for input video data according to one or more characteristics of the input video data, wherein the input video data is represented using code values of a transfer function at a bit depth of N bits, and wherein the focus dynamic range is less than a total dynamic range of the input video data such that one or more code values of the input video data are outside the focus dynamic range, and wherein the focus dynamic range is representable by code values of a transfer function of the encoder module at a bit depth of C bits;
crop the input video data to the focus dynamic range to generate cropped N-bit video data such that the cropped N-bit video data excludes the one or more code values of the input video data outside the focus dynamic range;
quantize the cropped N-bit video data according to the transfer function of the encoder module to generate C-bit video data, wherein N is greater than C; and
map the code values of the cropped N-bit video data to code values of a transfer function of the encoder module at a bit depth of C bits to generate C-bit video data, wherein N is greater than C; and
process the C-bit video data according to an encoding format to generate encoded video data as output; and
a decoder module configured to:
decode the encoded video data to generate decoded C-bit video data; and
expand the decoded C-bit video data according to a transfer function of a display device to generate D-bit video data covering full dynamic range of the display device.

19. The system as recited in claim 1, wherein, to map the code values of the input video data within the focus dynamic range to code values of the internal transfer function to generate C-bit video data, the adaptive transfer function module is configured to restrict the input video data to the focus dynamic range to generate cropped N-bit video data and map the code values of the cropped N-bit video data to code values of the internal transfer function to generate C-bit video data values.

* * * * *